United States Patent
Howdeshell et al.

(10) Patent No.: US 8,715,512 B2
(45) Date of Patent: May 6, 2014

(54) SYSTEMS AND METHODS FOR LIQUID SEPARATION

(75) Inventors: Michael Howdeshell, Ringle, WI (US); Edward J. Godeaux, Lafayette, LA (US); Asadollah Hayatdavoudi, San Ramon, CA (US); Curtis D. Cooley, Wausau, WI (US)

(73) Assignee: Siemens Energy, Inc., Orlando, FL (US)

( * ) Notice: Subject to any disclaimer, the term of this patent is extended or adjusted under 35 U.S.C. 154(b) by 597 days.

(21) Appl. No.: 12/594,234

(22) PCT Filed: Apr. 1, 2008

(86) PCT No.: PCT/US2008/004225
§ 371 (c)(1), (2), (4) Date: Apr. 2, 2010

(87) PCT Pub. No.: WO2008/123973
PCT Pub. Date: Oct. 16, 2008

(65) Prior Publication Data
US 2010/0187186 A1    Jul. 29, 2010

Related U.S. Application Data

(60) Provisional application No. 60/909,769, filed on Apr. 3, 2007.

(51) Int. Cl.
*B04C 9/00* (2006.01)
*B04C 5/081* (2006.01)
*B04C 5/04* (2006.01)
*B01D 21/26* (2006.01)

(52) U.S. Cl.
USPC ........ 210/788; 210/512.1; 210/151; 210/304; 210/DIG. 5; 209/730

(58) Field of Classification Search
USPC .......... 210/512.1, 512.2, 787, 788, 789, 799, 210/801, 704, 150, 258, 416.1, 304, 295; 209/730, 732, 734, 716, 717, 721
See application file for complete search history.

(56) References Cited

U.S. PATENT DOCUMENTS

| | | | |
|---|---|---|---|
| 2,754,968 A | * | 7/1956 | Hage et al. ............... 209/729 |
| 3,977,469 A | | 8/1976 | Broussard et al. |

(Continued)

FOREIGN PATENT DOCUMENTS

| | | |
|---|---|---|
| EP | 1457268 A2 | 9/2004 |
| GB | 2423490 A | 8/2006 |

(Continued)

OTHER PUBLICATIONS

International Preliminary Report on Patentability from corresponding International Application No. PCT/US08/04225 dated Jul. 5, 2009.

(Continued)

*Primary Examiner* — David C Mellon

(57) ABSTRACT

An apparatus and method for separating components of a fluid mixture. The apparatus includes a vortex generation zone shaped as an inverse truncated cone, a solids collection zone, a separation zone, one or more fluid inlets, one or more gas inlets, one or more fluid outlets, and one or more gas outlets. Gas is introduced into fluid in the vortex separation zone to facilitate the separation of components of the fluid mixture.

48 Claims, 11 Drawing Sheets

(56) References Cited

U.S. PATENT DOCUMENTS

| | | | |
|---|---|---|---|
| 4,214,982 | A | 7/1980 | Pfalzer |
| 4,397,741 | A | 8/1983 | Miller |
| 4,545,892 | A | 10/1985 | Cymbalisty et al. |
| 4,554,074 | A * | 11/1985 | Broughton .................... 210/519 |
| 4,627,922 | A | 12/1986 | Viator et al. |
| 4,728,428 | A | 3/1988 | Broussard, Sr. |
| 4,772,401 | A * | 9/1988 | Rawlins ........................ 210/788 |
| 4,876,016 | A | 10/1989 | Young et al. |
| 4,935,154 | A * | 6/1990 | Arnold .......................... 210/787 |
| 4,971,685 | A | 11/1990 | Jordan |
| 4,995,989 | A * | 2/1991 | Carroll et al. ................. 210/788 |
| 5,080,792 | A * | 1/1992 | McGovern et al. ........ 210/512.1 |
| 5,133,907 | A | 7/1992 | Hess |
| 5,158,678 | A | 10/1992 | Broussard, Sr. |
| 5,277,803 | A | 1/1994 | Broussard, Sr. |
| 5,300,222 | A | 4/1994 | Broussard, Sr. |
| 5,376,266 | A | 12/1994 | Broussard |
| 5,407,584 | A | 4/1995 | Broussard, Sr. |
| 5,492,622 | A | 2/1996 | Broussard |
| 5,510,019 | A | 4/1996 | Yabumoto et al. |
| 5,522,999 | A | 6/1996 | Broussard |
| 5,707,530 | A | 1/1998 | Broussard, Jr. |
| 5,725,764 | A | 3/1998 | Broussard, Jr. |
| 5,830,368 | A | 11/1998 | Peachey |
| 5,932,099 | A | 8/1999 | Cote et al. |
| 5,942,111 | A | 8/1999 | Broussard, Jr. |
| 6,109,778 | A | 8/2000 | Wilmer |
| 6,337,023 | B1 | 1/2002 | Broussard, Sr. et al. |
| 6,468,330 | B1 | 10/2002 | Lloyd |
| 6,629,686 | B2 * | 10/2003 | Morse et al. ................. 261/79.2 |
| 6,709,500 | B1 | 3/2004 | West |
| 7,144,503 | B2 | 12/2006 | Oserod |
| 7,157,007 | B2 | 1/2007 | Frankiewicz et al. |
| 7,172,701 | B2 | 2/2007 | Gaid et al. |
| 7,291,268 | B2 | 11/2007 | Bolman |
| 7,314,559 | B2 | 1/2008 | Hopper |
| 2007/0277967 | A1 | 12/2007 | Oserod |

FOREIGN PATENT DOCUMENTS

| | | |
|---|---|---|
| WO | 03045525 A1 | 6/2003 |
| WO | 2008123973 A1 | 10/2008 |

OTHER PUBLICATIONS

Written Opinion from corresponding International Application No. PCT/US08/04225 dated Jul. 8, 2008.

* cited by examiner

SYSTEMS AND METHODS FOR LIQUID SEPARATION

CROSS-REFERENCE TO RELATED APPLICATIONS

This application is a U.S. national stage application and claims the benefit under 35 U.S.C. §371 of International Application No. PCT/US2008/004225 filed on Apr. 1, 2008, entitled SYSTEMS AND METHODS FOR LIQUID SEPARATION, which claims priority under 35 U.S.C. §119(e) to U.S. Provisional Application Ser. No. 60/909,769 entitled "SEPARATION OF HYDROCARBON FROM AN AQUEOUS ENVIRONMENT," filed on Apr. 3, 2007, each of which is herein incorporated by reference in their entirety and to which this application claims the benefit of priority.

BACKGROUND OF INVENTION

1. Field of Invention

The present invention relates to systems and methods for separating components in a fluid mixture and, in particular, to systems and methods for separating fluids having different densities.

2. Discussion of Related Art

There is a recognized desire in multiple industries, including, for example, the oil and gas, food processing, marine transportation, and power generation to clean or remediate water generated in processing plants or other facilities utilized in these industries. Process water, often containing contaminants including hydrocarbons such as oil, as well as other contaminants and suspended solids, is a common byproduct of operations in these industries. In particular, the production of oil and gas wells and the refinement of these fluids produce wastewater contaminated with hydrocarbons.

A number of devices and systems are typically used to facilitate the recovery of water from contaminated wastewater by separation of oil from water in the wastewater. Such devices include hydrocyclones, gravity separation apparatus, air/gas flotation systems, and oil/gas skimmer systems.

SUMMARY OF INVENTION

In accordance with one or more embodiments, the invention relates generally to systems and methods for separating components of a fluid mixture, such as oil and solid contaminants from water. According to one embodiment of the present invention, an apparatus for separating a fluid mixture comprises a vessel, a vortex generation zone having a tapered wall positioned within the vessel, and a fluid inlet extending into the vortex generation zone at an angle having a component tangential to an internal wall of the vortex generation zone at a point on the internal wall proximate to the fluid inlet. The apparatus further comprises a gas inlet extending into the vortex generation zone, and a fluid outlet fluidly connected to the vessel.

According to another embodiment of the present invention an apparatus for separating a fluid mixture comprises a vessel, a vortex generation zone having a tapered wall positioned within the vessel and a separation zone in fluid communication with the vortex generation zone positioned within the vessel external to the vortex generation zone. The apparatus also comprises a gas inlet in fluid communication with the vortex generation zone, and a fluid outlet in fluid communication with the separation zone.

Another aspect of the invention is directed to a method of separating a fluid mixture. The method comprises providing a fluid mixture comprising a first component and a second component, the first component having a density different than a density of the second component, and introducing the fluid mixture into a vortex generation zone comprising a tapered wall positioned within a vessel. The method further comprises inducing upward flow of the fluid mixture in the vortex generation zone, imparting a confined rotational momentum to the first component and the second component in the vortex generation zone, and introducing gas into the fluid mixture in the vortex generation zone. The method also comprises releasing the confined rotational momentum of the fluid mixture to form a first zone comprising the fluid mixture rich in the first component and a second zone comprising the fluid mixture rich in the second component, and discharging at least a portion of the fluid mixture rich in the first component from a first fluid outlet of the vessel.

Other advantages, novel features, and objects of the invention will become apparent from the following detailed description of the invention when considered in conjunction with the accompanying drawings.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. Preferred non-limiting embodiments of the present invention will be described with reference to the accompanying drawings in which.

DETAILED DESCRIPTION

Figure 1:
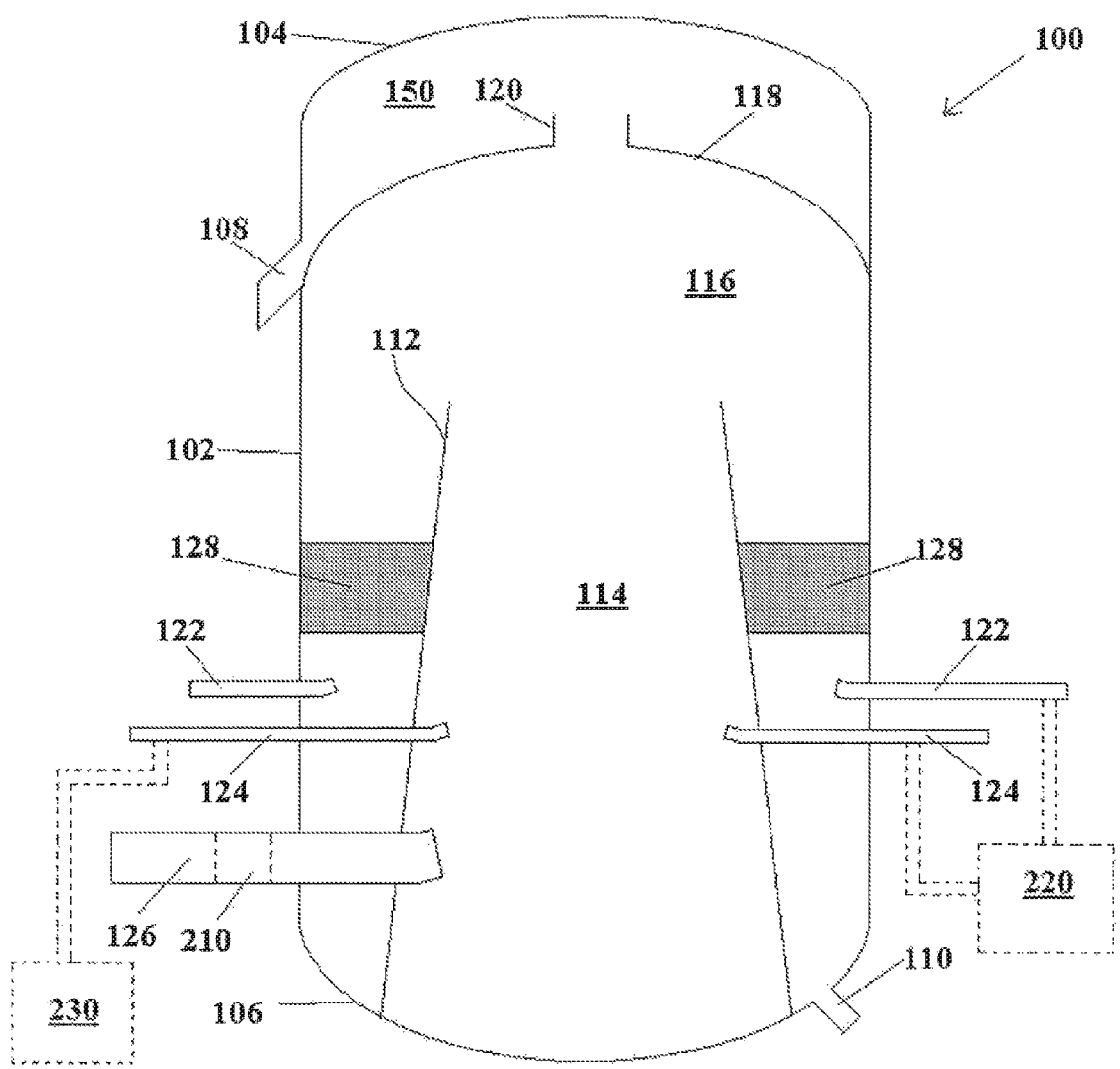
FIG. 1 is a side cross-sectional view of an apparatus according to one embodiment of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As used herein, the term "fluid mixture" encompasses, but is not limited to, mixtures of fluids, mixtures of fluids and solids, and mixtures of fluids and/or solids and/or slurries.

In a fluid mixture comprising components of different densities, for example, water and a hydrocarbon such as oil, the components may be separated at least in part by inducing a rotational flow to the fluid mixture. For example, if the fluid mixture is placed within a vessel and a rotational flow is imparted to the fluid mixture about the inside of the vessel, a fluid component with a lower density migrates toward a central axis of the rotational flow in response to the centripetal and/or centrifugal forces generated by the rotational flow. A fluid with a higher density migrates toward a periphery of the rotational flow in response to the centripetal force generated by the rotational flow. A fluid rich in the less dense component could be removed from an area proximate the central axis of the rotating fluid mixture. Alternatively or additionally, a fluid rich in the denser component could be removed from an area proximate the periphery of the mass of the rotationally flowing fluid mixture.

Fluid mixtures comprising components of different densities may also separate over time by gravitational separation. If a fluid mixture containing a less dense component such as oil and a denser component such as water is allowed to sit in a vessel in a non-agitated state, over time the less dense component rises and the denser component sinks, resulting in a fluid rich in the less dense component at an upper level of the fluid mixture and a fluid rich in the denser component at a lower portion of the fluid mixture. This separation process may be accelerated by, for example, contacting gas bubbles having a density less than that of the less dense component, with the less dense component in the fluid mixture. Gas bubbles may be contacted with the less dense component in a number of ways including, for example, by introducing a fluid containing dissolved gas into a fluid mixture to be separated, or by introducing gas in the form of bubbles directly into the fluid mixture. The fluid mixture and gas may be further mixed to bring the gas, dissolved gas, or gas bubbles that form from the dissolved gas, into contact with the less dense component. In some instances, some of the gas may diffuse into the less dense component, thereby increasing the buoyancy of the less dense component. A gas flotation separation system may also, in some instances, be assisted by the introduction of heat to the fluid mixture and/or to the gas.

Various embodiments of apparatuses and methods of separating a fluid mixture according to the present invention may comprise one or more of these methods of inducing separation of one or more less dense components from one or more denser components in a fluid mixture. In the following description of various embodiments of the present invention, separation of components in a fluid mixture will be described in terms of separating a fluid mixture including a hydrocarbon component and water into a fluid rich in the hydrocarbon component and a fluid rich in water, but it is to be understood that the various embodiments of the present invention are not limited to separating a fluid mixture into a hydrocarbon rich component and a water rich component. Various embodiments of the present invention may be utilized to separate any of a number of different fluid mixtures into any of a number of different components based on different densities. For example, the system and method of embodiments of the present invention may be used to separate a mixture containing hydrocarbons of different densities, mixtures of biological fluids of different densities, a mixture of $H_2O$ (normal water) and $D_2O$ (heavy water), a mixture of water and heavy brine, or a tar sand slurry having bitumen and other solids.

In some embodiments, the components of the fluid to be separated need not have different densities. In these embodiments, the effective densities of the components may be altered as part of the separation process. In some embodiments, a characteristic of a component may be changed by, for example, a chemical reaction to alter the density of the component relative to another component in a mixture. For example, if a first component of a fluid mixture has a greater affinity for a gas than a second component, that gas could be added to the mixture to alter the density of the first component relative to the second component.

Apparatuses according to embodiments of the present invention for effecting separation of a fluid mixture may generally comprise an external vessel housing an inner structure, within which a rotational motion may be imparted to a fluid mixture introduced therein. The inner structure is referred to herein as a vortex generation zone. In some embodiments one or more fluid inlets may be provided to introduce fluid into the vortex generation zone. The fluid inlets may be arranged to introduce fluid to be separated into the vortex generation zone at an angle with a component tangential to an inner wall of the vortex generation zone proximate the fluid inlets in order to induce a rotational flow of fluid about the inside of the vortex generation zone. The fluid inlets may also be arranged to introduce fluid to be separated into the vortex generation zone at an upward angle in order to induce an upward flow of fluid through the vortex generation zone.

One or more gas inlets may be provided to provide gas in the form of bubbles or dissolved gas into the vortex generation zone. The gas may contact one or more components of the fluid mixture, facilitating upward movement of the one or more components relative to one or more other components, in some instances by altering the effective density of these components. This may facilitate separation of the components of the fluid mixture. The rotational flow of fluid in the vortex generation zone may induce separation of fluid components with different effective densities through the action of centripetal and/or centrifugal force.

Above and around the vortex generation zone within the separation vessel may be a separation zone. After flowing through the vortex generation zone, the partially separated fluid mixture may enter the separation zone. In the separation zone, less dense fluid components float upwards while denser fluid components fall downwards. Additional gas may be introduced by gas inlets into the separation zone to further facilitate separation of the fluid components.

Proximate an upper end of the separation zone, fluid rich in the less dense component may be removed through an upper fluid outlet. Proximate a lower end of the separation zone, a fluid rich in the denser component may be removed through a lower fluid outlet.

Illustrated in FIG. 1 is an apparatus for separating a fluid mixture into multiple constituent components according to one aspect of the present invention. The apparatus comprises a vessel 100 with side walls 102, an upper wall 104, and a bottom wall 106. Vessel 100 may be any size and shape suitable for a particular purpose. Vessel 100 may in some embodiments be cylindrical, rectangular, square, or round.

Vessel 100 may have a height to provide sufficient distance for a desired amount of separation of components. Vessel side wall 102 in some embodiments is curved thereby forming a cylindrical vessel. Upper wall 104 and/or lower wall 106 may, in some embodiments, be curved as is illustrated in FIG. 1, but may also be planar, concavely curved, or of any of multiple different configurations.

The vessel 100 may comprise a tapered wall 112 positioned within the vessel. It is to be understood that the term "tapered wall" means a wall which is angled with respect to a vertical axis at least one portion of the wall. Tapered wall 112 is connected to lower wall 106 and defines a vortex generation zone 114 with an exit at one end. The cross sectional area of vortex generation zone 114 at a base proximate lower wall 106 may be larger than a cross sectional area at an exit of vortex generation zone 114. A height of tapered wall 112 may be sufficient to provide desired residence time of a fluid mixture in the vortex generation zone 114 and/or a desired amount of separation of components of a fluid mixture introduced into vortex generation zone 114. The taper of tapered wall 112 may be constant, as illustrated in FIG. 1, or may have one or more regions where the rate of taper increases or decreases. The tapered wall 112 may be curved. In some embodiments, tapered wall 112 may be in the form of an inverted truncated cone having a cross sectional diameter larger at a base than a cross sectional area at an upper end. The taper need not be uniform at all regions about the periphery of the tapered wall 112.

Tapered wall 112 defines a region interior to the vessel 100 that is referred to herein as vortex generation zone 114. When in use, a fluid mixture is introduced into a lower portion of the vortex generation zone 114 at an angle with a component tangential to tapered wall 112 at a point of introduction. Due to the angle of introduction, the fluid mixture attains a certain rotational velocity. Due to conservation of rotational momentum, the rotational velocity increases as the fluid mixture rises through the vortex generation zone as the cross sectional area or diameter of the vortex generation zone becomes smaller. The rotational flow induces less dense components of the fluid mixture to migrate toward the center of the vortex generation zone and denser components to migrate toward the tapered wall 112 due to the action of centripetal and/or centrifugal force. As the rotational velocity of fluid passing upward through the vortex generation zone increases, so does the centripetal and centrifugal forces experienced by the components of the fluid, which may lead to further separation of fluid components at the upper end of the vortex generation zone.

The taper of tapered wall 112 may be selected to provide a rotational fluid velocity within the vortex generation zone sufficient to separate fluid components to a desired degree for a particular fluid throughput. The taper of the tapered wall 112 of the vortex generation zone may also be selected to provide a residence time of the fluid mixture in the vortex generation zone sufficient to allow adequate mixing of and contact between the fluid mixture and gas bubbles that may be introduced into the vortex generation zone in addition to the fluid mixture. For a given vessel height, as the taper of wall 112 becomes greater, the rotational velocity at an upper region of the vortex generation zone becomes greater, and the residence time of fluid and the available time in which gas bubbles may contact the fluid components in the vortex generation zone decreases.

Figure 2:
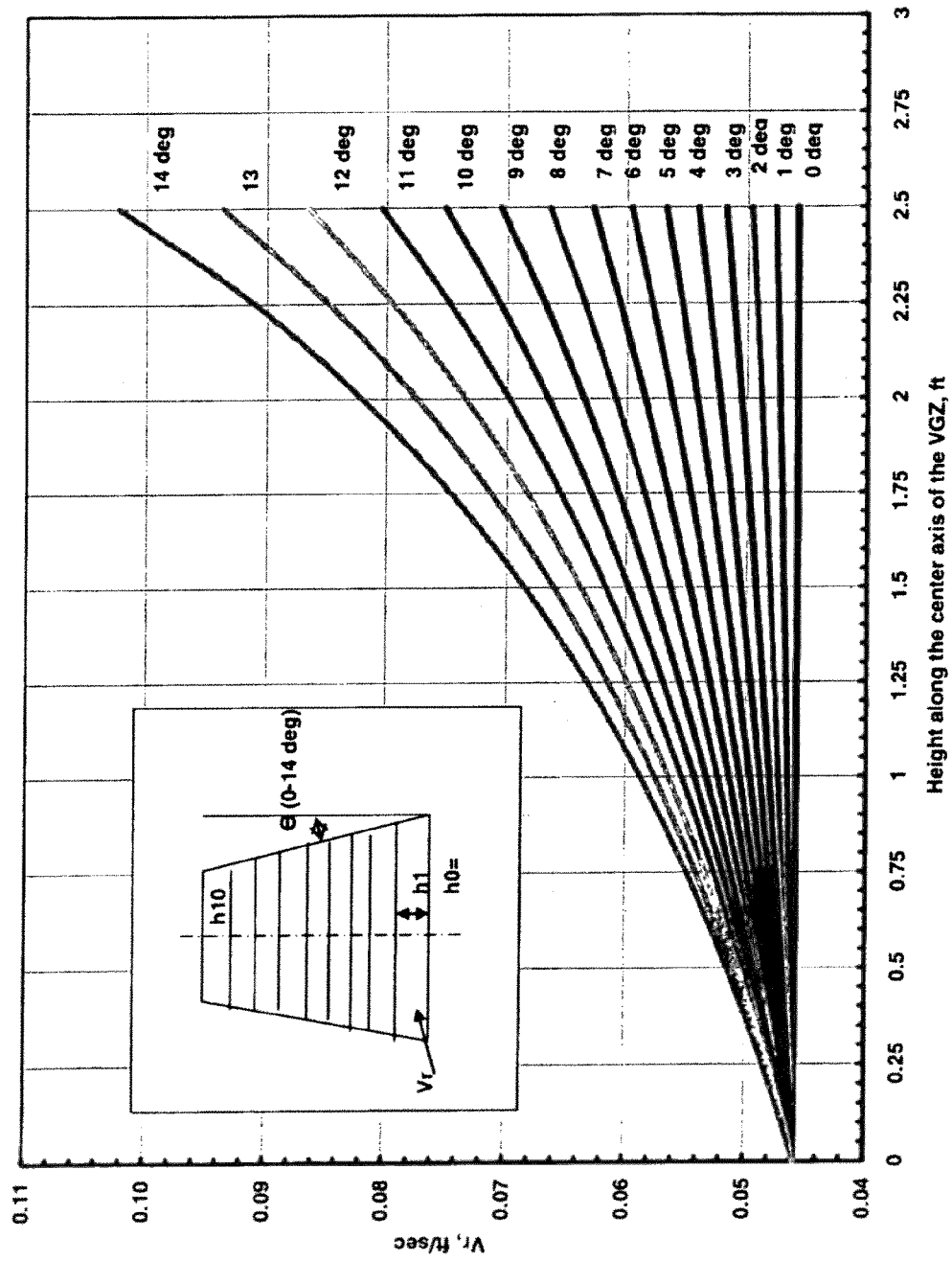
FIG. 2 is a chart of rotational velocity of fluid versus wall taper in a vessel according to an embodiment of the present invention.

FIG. 2 illustrates resultant velocity Vr versus height within a vortex generation zone in relation to a taper angle of tapered wall 112 according to one embodiment of the invention with a vortex generation zone having a 27 inch diameter base and an initial resultant velocity Vr of introduced fluid of 0.046 feet/second. Resultant velocity is to be understood to mean the total velocity of the fluid, comprising both vertical and horizontal components, as opposed to rotational velocity which comprises only a horizontal component. Resultant velocity Vr will increase for various angles of tapered wall 112 when fluid is introduced with an initial resultant velocity Vr. In FIG. 2, the resultant velocity of fluid increases as it moves up the tapered wall. The rate of increase in resultant velocity increases at a given height as the angle of taper of tapered wall 112 increases. As the rotational velocity of the fluid mixture increases, the upper surface of the fluid mixture may begin to dish and form a parabolic bowl-like surface due to centripetal and centrifugal forces. For example, for a vortex generation zone with a height of 2.5 feet, a base diameter of 27 inches, and an inlet flow of oily water of 145 gallons/minute, dishing of the surface of the fluid mixture may begin to develop if the vortex generation zone walls taper at an angle of greater than about 5 degrees from vertical. In some embodiments this dishing may interfere with the removal of fluid from the upper fluid outlet 120.

Thus, it may be desirable to consider both the rotational velocity and residence time of fluid in the vortex generation zone when selecting a taper angle for tapered wall 112. The taper angle may be selected based on factors including, for example, the size and shape of the vortex generation zone, the throughput of fluid through the vessel, and the method of extraction of less dense components of a fluid mixture from the vortex generation zone and/or separation zone. Tapered wall 112 in some embodiments is generally tapered at an angle between zero and about 14 degrees from vertical to avoid turbulent flow within the vortex generation zone and/or separation zone. In some embodiments a taper angle of greater than about 14 degrees may result in turbulent flow within the vortex generation zone and/or separation zone which may result in the dispersal of droplets of a less dense component of the fluid mixture rather than a coalescence and separation of this component from denser components of the fluid mixture. In other embodiments the taper may be between about 5 and about 10 degrees from vertical. In some embodiments a taper angle of greater than about 10 degrees may result in dishing of the surface of the fluid mixture in the vessel which may be sufficiently great to interfere with the removal of less dense components of a fluid mixture from the vortex generation zone and/or separation zone. In other embodiments the taper may be about nine degrees from vertical.

The overall shape and volume of the vortex generation zone may be selected based upon factors such as the type of fluid mixture to be separated, the desired throughput, and/or desired overall footprint of the separation vessel. In many instances, a higher throughput and a smaller footprint are desired. As an example, a vessel including a vortex generation zone designed for separating oil from water with a throughput of 5,000 barrels/day (approximately 145 gallons/minute) and configured to fit on a skid with a size of about 12 feet long by about eight feet wide may have a vortex generation zone with a diameter at its widest point of about 27 inches and a diameter at its upper end of about 17.5 inches, with a height of about 30 inches and a wall taper of about 9 degrees from vertical to provide adequate separation of the oily water. A vessel including a vortex generation zone of these dimensions might in some embodiments have a footprint of about 10 feet long by about seven feet wide to allow for placement of additional units on the skid, or the use of a smaller skid. For greater throughputs, the vortex generation zone could be increased in size, or the wall taper decreased. In some embodiments, additional units, such as, for example, pretreatment or post-treatment units could occupy the same skid as a vessel according to embodiments of the present invention.

External to vortex generation zone 114 is a separation zone 116. Separation zone 116 is located above and beside vortex generation zone 114. The size of the separation zone 116, including the height of the separation zone and the width of the separation zone may be selected to provide a desired residence time for fluid in the separation zone 116. Separation zone 116 is defined by vessel wall 102, lower wall 106, tapered wall 112, and upper internal wall 118. In FIG. 1, upper internal wall 118 is illustrated having a dome-like curved shape, but in some embodiments upper internal wall 118 may have a different curvature, no curvature at all, or may have a curvature only along a portion of its diameter. Upper internal wall 118 includes an upper fluid outlet 120 located proximate a central vertical axis of the vessel proximate the separation zone 116 and above a central region of the vortex generation zone 114.

Figure 3:
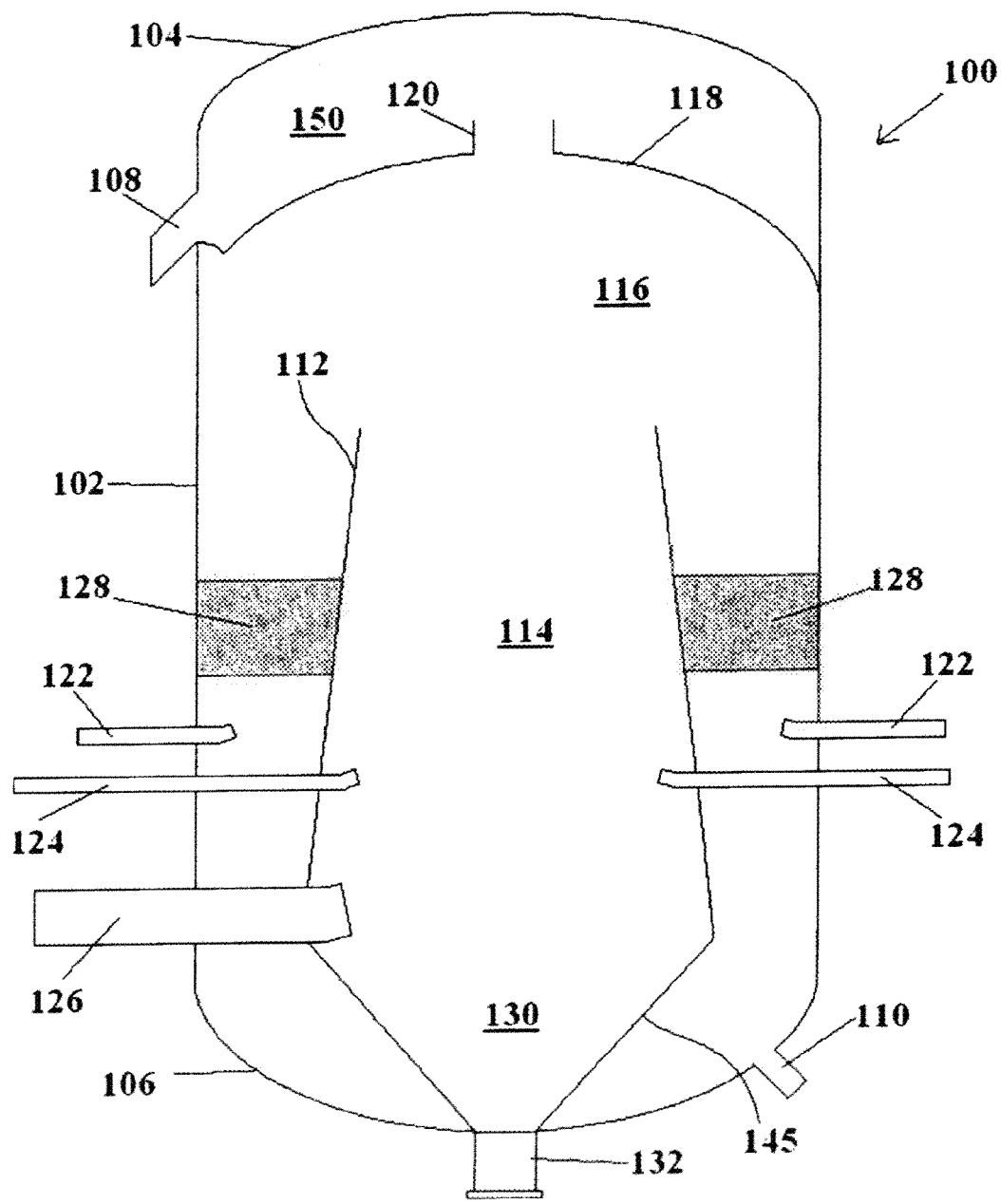
FIG. 3 is a side cross-sectional view of an apparatus according to another embodiment of the present invention.
Figure 4:
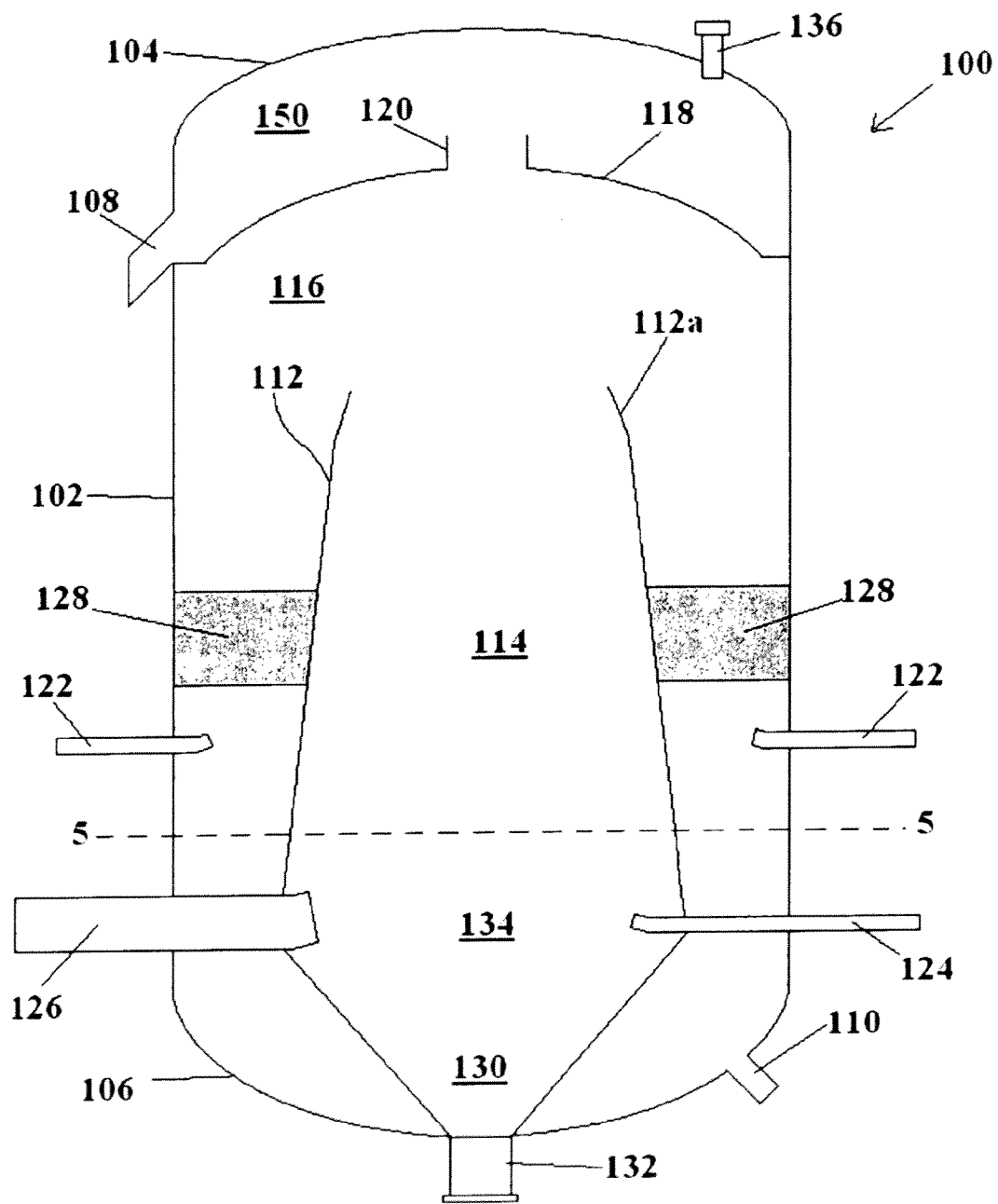
FIG. 4 is a side cross-sectional view of an apparatus according to a further embodiment of the present invention.

Upper fluid outlet 120 may in some embodiments be located above the upper end of the vortex generation zone. In use, upper fluid outlet 120 is an outlet for fluid rich in a component less dense than another component of a fluid mixture that is introduced into the vessel 100. The walls of fluid outlet 120 are illustrated in FIG. 1 as vertical, but this should not be considered limiting. In some embodiments, the walls of fluid outlet 120 may be tapered, or even non-existent. The combination of upper internal wall 118, fluid outlet 120, upper vessel wall 104, and upper vessel fluid outlet 108 as illustrated in FIGS. 1, 3, and 4 may be referred to as a "head-in-head" fluid outlet design. In some embodiments, alternate structures and methods may be used to remove fluid rich in a less dense component of a fluid mixture from vortex generation zone 114 and/or separation zone 116. These alternative structures and methods may include, for example, a skimmer, a suction pump and associated tubing, a cone-like fluid accumulator, and a siphon tube.

Vessel 100 may also include one or more fluid inlets 126 fluidly connected to the vortex generation zone 114. Although one fluid inlet 126 is illustrated in FIG. 1, some embodiments may include a plurality of fluid inlets 126. In operation, fluid inlet or inlets 126 supply a fluid mixture to be separated into the vortex generation zone 114 of vessel 100. In some methods, a gas may be introduced into a fluid mixture flowing through inlet or inlets 126 prior to the fluid entering the vortex generation zone 114.

Fluid inlet or inlets 126 may in some embodiments be positioned and angled to introduce fluid into the vortex generation zone in a direction angled upwards from a horizontal axis. In some embodiments, fluid inlet or inlets 126 may introduce a fluid mixture into the vortex generation zone at an angle between zero and about ten degrees above a horizontal axis. In some embodiments, an angle of fluid introduction into the vortex generation zone of greater than about ten degrees above a horizontal axis may result in insufficient residence time of the fluid mixture in the vortex generation zone to effect sufficient separation of components of the fluid mixture. In other embodiments, the fluid inlet angle may be between about one and two degrees in order to provide greater residence time of fluid mixture in the vortex generation zone. In other embodiments, this angle may be approximately one degree.

In some embodiments, the upward angles of fluid inlet or inlets 126 may be selected to impart an upward velocity component to a fluid mixture in the vortex generation zone sufficient to provide a desired throughput or residence time of fluid in the vortex generation zone. If a plurality of fluid inlets 126 are present, they need not all be angled at the same angle from the vertical axis. For embodiments where a large residence time and/or a large time period during which gas may contact components of the fluid mixture in the vortex generation zone is desired, the fluid inlet or inlets 126 might, for example, be angled at a 1.2 degree upward angle.

Fluid inlet or inlets 126 may also in some embodiments be positioned and angled introduce fluid into the vortex generation zone at an angle having a vector component tangential to an internal wall of the vortex generation zone 114 at a point on the internal wall proximate the fluid inlet or inlets 126. This may reduce the likelihood of head on collisions of the fluid flow and/or assist in the creation of rotational flow of fluid within the vortex generation zone. Head on collisions of fluid flows within the vortex generation zone may in some instances result in turbulence and the creation of larger gas bubbles from the coalescence of smaller gas bubbles that may be present in the vortex generation zone, which may be undesirable for reasons that will be explained more fully below. If a plurality of fluid inlets 126 are present, they need not all be angled at the same angle relative to an internal wall of the vortex generation zone 114 at a point on the internal wall proximate each fluid inlet 126.

Vessel 100 may have multiple fluid outlets including a first fluid outlet 108 and a second fluid outlet 110. The positions of first and second fluid outlets 108, 110, may be anywhere on upper or lower portions of the vessel. In one embodiment, first fluid outlet 108 is located on an upper portion of vessel 100. Fluid outlet 108 may be an outlet for less dense components of a fluid mixture. In another embodiment, second fluid outlet 110 is located on a lower portion of vessel 100 and is fluidly connected to separation zone 116. Fluid outlet 110 may be an outlet for denser components of a fluid mixture. In yet another embodiment, second fluid outlet 110 may be located below gas inlet 122, when present to avoid or minimize the removal of gas introduced by gas inlet or inlets 122. In yet another embodiment, second fluid outlet 110 may be located at least about one foot below gas inlet 122. The outlets may take shapes and forms of any fluid outlets known in the art.

The vessel according to embodiments of the present invention may include one or more gas inlets to direct gas into the vortex generation zone, the separation zone, or both. The gas introduced through these inlets may be introduced in the form of free gas, gas bubbles in a fluid, or as gas dissolved in a fluid.

Referring to FIG. 1, gas inlets 122 are fluidly connected to the separation zone 116 and gas inlets 124 are fluidly connected to the vortex generation zone. Gas inlets 122 are positioned to supply a gas, or in some embodiments, a fluid comprising gas bubbles or dissolved gas, into the separation zone 116 of vessel 100. In some embodiments, these inlets are positioned above lower fluid outlet 110. In some embodiments, these inlets are positioned at least about a foot above lower fluid outlet 110. Positioning gas inlets 122 sufficiently above lower fluid outlet 110 may reduce the amount of gas or prevent gas introduced through gas inlets 122 from being drawn out along with any fluid flowing out of the vessel through lower fluid outlet 110. Gas inlets 124 are positioned to supply a gas, or in some embodiments, a gas-containing fluid, into the vortex generation zone 114 of vessel 100. Although two of each of gas inlets 122 and 124 are illustrated in FIG. 1, in some embodiments one or more gas inlets 122 may be provided to introduce gas into the separation zone and one or more gas inlets 124 may be provided to introduce gas into the vortex generation zone.

In some embodiments, gas inlets 124 may be positioned and angled to introduce a gas or a fluid containing gas bubbles or dissolved gas into the vortex generation zone at an angle sufficient to impart an upward velocity component to the fluid mixture in the vortex generation zone sufficient to provide a desired throughput or residence time of the fluid mixture in the vortex generation zone. In some embodiments, this angle may be from zero to about 45 degrees above a horizontal axis. For embodiments where a large residence time is desired, the gas inlet or inlets 124 may be positioned to introduce gas or a gas-containing fluid horizontally or even at an angle below a horizontal axis into the vortex generation zone.

Gas inlet or inlets 124 may also in some embodiments be positioned and angled to introduce gas into the vortex generation zone at an angle having a vector component tangential to an internal wall of the vortex generation zone 114 at a point on the internal wall proximate the gas inlet or inlets 124. This may reduce the likelihood of head on collisions of different fluid streams and/or assist in the creation of rotational flow of fluid within the vortex generation zone. If a plurality of gas inlets 124 are present, they need not all be angled at the same angle relative to an internal wall of the vortex generation zone 114 at a point on the internal wall proximate each gas inlet 124.

In some embodiments, gas inlet or inlets 122 may be positioned and angled to introduce a gas or a fluid containing gas bubbles or dissolved gas into the separation zone 116 at an angle sufficient to impart a desired residence time to fluid in the separation zone. Gas inlet or inlets 122 may be positioned at an angle to provide a desired flow of fluid in the separation zone, which may depend on multiple factors, including, for example, the configuration of the vortex generation zone, the type of fluid mixture to be separated, the desired residence time of fluid in the vessel, and the desired flow of gas or gas-containing fluid through gas inlet or inlets 122. Gas inlet or inlets 122 may also be positioned to provide a desired dispersal of gas within the separation zone. A lower angle of entry may allow gas introduced through gas inlet or inlets 122 to disperse throughout the separation zone more evenly and provide an increased opportunity for gas to contact components of the fluid mixture as the gas rises than a higher angle of entry. In some embodiments, this angle may be from zero to about 45 degrees above a horizontal axis. This angle of entry may in some embodiments be below a horizontal axis, further increasing residence time of fluid in the separation zone 116. If a plurality of gas inlets 122 are present, they need not all be angled at the same angle above a horizontal axis.

Gas inlet or inlets 122 may also in some embodiments be positioned and angled introduce gas into the separation zone 116 at an angle having a vector component tangential to an internal wall of the separation zone 116 at a point on the vessel wall 102 proximate the gas inlet or inlets 122. This may reduce the likelihood of head on collisions of the fluid flow and/or assist in the creation or maintenance of rotational flow of fluid within the separation zone. If a plurality of gas inlets 122 are present, they need not all be angled at the same angle relative to the vessel wall 102 at a point on the vessel wall proximate each gas inlet 122.

The angles of introduction of the fluid mixture and gas into the vortex generation zone may be selected to reduce the incidence of head on collision of the flow of fluid to be separated and the flow of gas-containing fluid. Head on collisions of these fluid flows may result in turbulence and/or coalescence of dissolved gas into large gas bubbles, which may in some instances be undesirable. For example, the coalescence of dissolved gas into larger gas bubbles may reduce the total surface area of the gas and/or the dispersion of the gas thereby reducing contact with the fluid mixture which may reduce separation efficiency. Also, larger gas bubbles may travel more quickly upward through the vortex generation zone than smaller gas bubbles, providing less time for possible contact between the gas bubbles and components of the fluid mixture in the vortex generation zone.

In some embodiments, fluid inlet or inlets 126 may comprise additional separators, such as an internal preliminary spiral separator 210. The preliminary spiral separator may cause an initial partial separation of the fluid mixture into its constituent components and/or increase the size of droplets of less dense components, such as, for example, hydrocarbons present in the fluid mixture. In some embodiments, the preliminary spiral separator may be located upstream of fluid inlet or inlets 126 and be in fluid communication with inlet or inlets 126 and with a source of a fluid mixture. An example of a preliminary spiral separator that may be utilized is described in U.S. Pat. No. 5,277,803, hereby incorporated by reference in its entirety for all purposes. Particularly, SPIRALSEP, element 34 of U.S. Pat. No. 5,277,803, is one embodiment of a spiral separator that may be utilized in certain embodiments of the present invention.

Vessel 100 may also include a coalescence material 128 in the separation zone 116. The coalescence material 128 may comprise discreet sections of material, or in some embodiments may be a continuous material that may substantially or completely encircle tapered wall 112 and may extend from tapered wall 112 to vessel side wall 102. The coalescence material may be positioned above gas inlet or inlets 122. In some embodiments, the coalescence material may be supported by a support structure (not shown) that may be adjustable with regard to height within the vessel.

Any coalescence material having a high surface area to volume ratio and resistance to degradation by the components of fluid to be separated in a particular system may be suitable for use in some embodiments. Suitable coalescence materials may include, for example, a packed bed of coalescing media such as Nacto-Lescer® (available from National Tank Co., Houston, Tex.) or sheet media such as Performax® coalescing media (available from National Tank Co., Houston, Tex.). Other sheet type coalescing media which may be used are described in U.S. Pat. Nos. 5,300,222 and 5,407,584, hereby incorporated by reference in their entireties for all purposes. This coalescence packing may comprise a modular sheet type medium with a cross fluted structure creating numerous interconnecting channels.

In operation, coalescence material 128 may reduce the velocity and/or turbulence of fluid flowing rotationally downward in a counter-current flow in the separation zone. The reduced velocity and/or turbulence may allow gas bubbles or dissolved gas present in the separation zone or gas bubbles or dissolved gas that may be introduced from gas inlet or inlets 122 to make contact with a less dense fluid component such as, for example, hydrocarbons present in the separation zone, thereby facilitating the flotation of this component upward through separation zone 116. The coalescence material 128 may also retain a less dense component present in a fluid flowing downward through the separation zone, while allowing a denser component to pass through and in some embodiments, to be removed through lower fluid outlet 110.

Referring to FIG. 3, vessel 100 may also include a solids collection zone 130 defined by intermediate wall 145. Intermediate wall 145 may be sealingly connected to tapered wall 114 and solids outlet 132 of vessel 100. This solids collection zone may be located beneath and in fluid communication with vortex generation zone 114. In operation, as a fluid mixture introduced into the vessel flows through vortex generation zone 114, solids present in the fluid mixture may drop out of the mixture by the force of gravity and settle in solids collection zone 130. The accumulated solids may be removed from solids collection zone 130 either continuously or intermittently through solids outlet 132.

FIG. 3 also illustrates an alternate configuration of upper wall 118 in the head-in-head outlet. In FIG. 3, wall 118 does not have a constant curvature along its entire diameter, but rather has an upwardly curved portion proximate upper fluid outlet 108. This may provide an intermediate collection area to reduce the swirling motion and/or the further introduction of gas into the less dense component in zone 150.

FIG. 4 illustrates an alternate configuration of vessel 100. As is illustrated in FIG. 4, vessel 100 comprises gas inlet or inlets 124 and fluid inlet or inlets 126 positioned and arranged along a common horizontal plane. In other embodiments, gas inlet or inlets 124 may be positioned above or below a horizontal plane defined by fluid inlet or inlets 126. For example, in some embodiments, gas inlet or inlets 124 may be positioned about six inches below or above a horizontal plane defined by fluid inlets 126. Placing gas inlet or inlets 124 and fluid inlet or inlets 126 at different heights in the vortex generation zone may reduce the instance of head on collision of fluid flows from other inlets. In some embodiments, gas inlet or inlets 124 and fluid inlet or inlets 126 may be positioned proximate the intersection of tapered wall 112 and a plane passing horizontally through a portion of the vortex generation zone with the greatest cross sectional area 134, or other words, proximate the tapered wall 112 at the widest point of the vortex generation zone, as is illustrated in FIG. 4. The diameters and shapes of gas inlets 122, gas inlets 124, and fluid inlets 126 may be selected to suit the particular requirements for a particular application. For example, in vessels designed to process a large amount of fluid per day, larger diameter inlets may be used than would be used in a vessel designed to process a lesser amount of fluid per day in order to accommodate a greater fluid flow.

FIG. 4 also illustrates an alternate configuration of upper wall 118 in the head-in-head outlet. In FIG. 4, wall 118 is not curved along its entire diameter, but rather has a flattened portion near its periphery. This may for immediate removal of a less dense component of the fluid mixture. In another embodiment, the flat portion of upper wall 118 proximate outlet 108 may be at a different elevation than the flat portion of wall 118 on an opposite side of vessel 100 in order to facilitate removal of fluid through outlet 108.

Also as illustrated in FIG. 4, tapered wall 112 of the vortex generation zone may include an upper wall region 112a having a different taper than a remaining portion of tapered wall 112. In some embodiments, this upper wall region 112a may function to increase the rotational velocity of fluid just before it exits the vortex generation zone in order to further separate the fluid components. Providing a vortex generation zone with a high degree of taper at only a region near its upper end may allow for increasing the rotational velocity of a fluid in the vortex generation zone, thus assisting in a forced coalescence of a less dense component of the fluid mixture, while maintaining a residence time sufficiently great to provide adequate contact of components of the fluid mixture with gas in the vortex generation zone.

Figure 5:
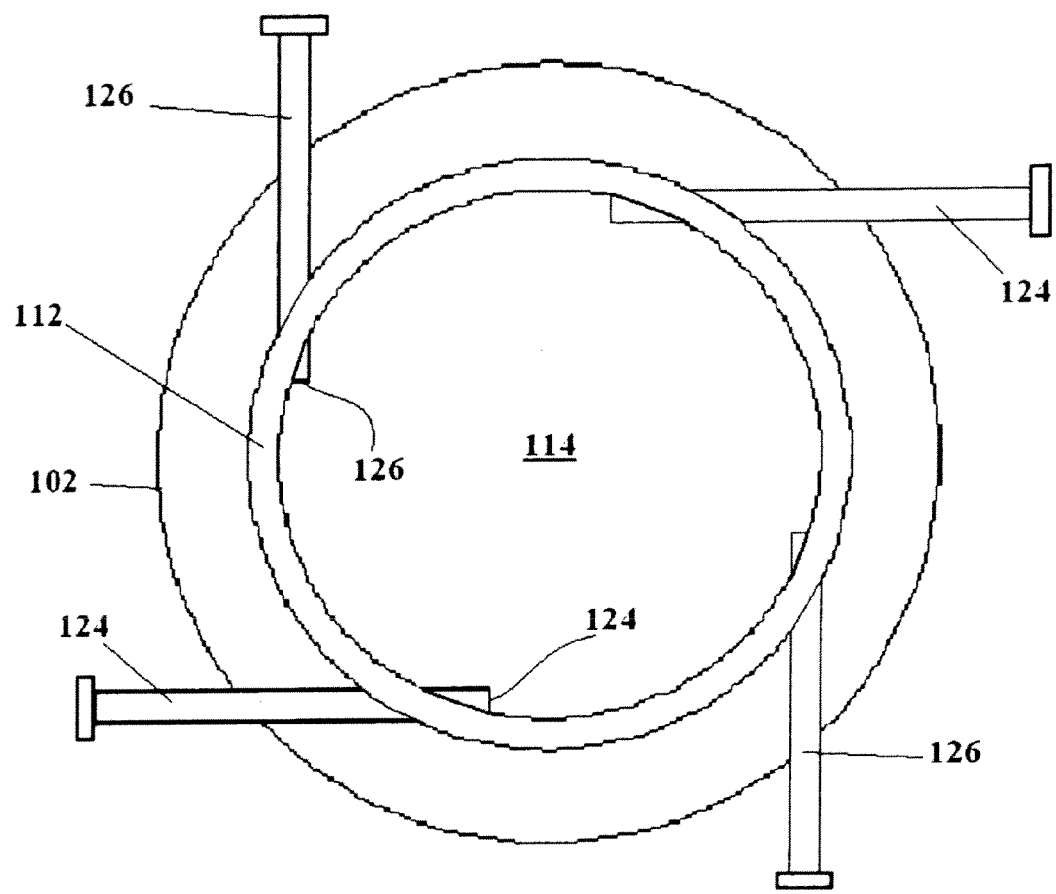
FIG. 5 is a top down cross-sectional view through line 5-5 of FIG. 4 of an apparatus according to an embodiment of the present invention.

FIG. 5 is an alternate view of the arrangement of fluid inlets 126 and gas inlets 124 of FIG. 4. FIG. 5 is a top down cross-sectional view through line 5-5 of FIG. 4. FIG. 5 illustrates a vessel comprising two each of gas inlets 124 and fluid inlets 126, each of which is positioned to introduce fluid and/or gas into the vortex generation zone at an angle substantially tangential to an internal wall of the vortex generation zone 114 at a point on the internal wall proximate the inlets. In some embodiments, gas inlets 124 and fluid inlets 126 may be positioned and angled to introduce fluid and/or gas into the vortex generation zone at and angle with a smaller tangential component than is illustrated in FIG. 5. Gas inlets 124 and fluid inlets 126 may, but need not, be angled to introduce fluid and/or gas into the vortex generation zone at the same or similar angles. Gas inlets 124 may be evenly spaced about the vortex generation zone relative to each other and in some embodiments also relative to fluid inlets 126. Gas inlets 124 and fluid inlets 126 may be alternatingly positioned and substantially evenly spaced about the vortex generation zone. Gas inlets 122 may also be evenly or approximately evenly spaced about a periphery of the vortex generation zone 114. In some embodiments, gas inlets 124 and/or fluid inlets 126 may not extend into the vortex generation zone, as is illustrated in FIG. 5, but rather may terminate at the tapered wall 112. Gas and/or fluid from gas inlets 124 and/or fluid inlets 126 may in these embodiments flow into vortex generation zone 114 through orifices in tapered wall 112. These orifices may in some embodiments take the form of ellipses having dimensions of, for example, a major axis of three inches extending horizontally along tapered wall 112 and a minor axis of one inch extending vertically along tapered wall 112, or a major axis of two inches and a minor axis of 0.6 inches. These orifices may in alternate embodiments be circular, triangular, rectangular, or shaped in other manners that may allow introduction of a fluid mixture into the vortex generation zone 114 and impart a rotational velocity to this fluid mixture.

In operation, introduction of the fluid mixture through one or more fluid inlets 126 into the vortex generation zone 114 at an upward angle and at an angle having a component tangential to the internal wall of the vortex generation zone proximate the position of fluid introduction may induce a spiral upward flow of the fluid in the vortex generation zone 114. The fluid may flow in a spiral upward path through vortex generation zone 114 and then into separation zone 116 above and beside vortex generation zone 114.

Within the vortex generation zone, the fluid mixture introduced from one or more fluid inlets 126 and gas or fluid containing gas bubbles and/or dissolved gas introduced through gas inlets 124 may be introduced at approximately identical angles such that a rotating co-current flow of the fluids from gas inlets 124 and fluid inlets 126 is generated. For example, fluid introduced through fluid inlets 126 and gas inlets 124 may both be introduced at an angle with a vector component tangential to the wall of the vortex generation zone proximate the position of introduction such that the fluid and the gas flows in a clockwise direction. Co-current flow of the fluid and the gas within the vortex generation zone may be beneficial in some instances in order to reduce turbulence in the vortex generation zone and/or prevent head on collision of the fluid flows that might result in smaller gas bubbles coalescing into larger gas bubbles that may be less effective in contacting components of the fluid mixture.

Figure 12A:
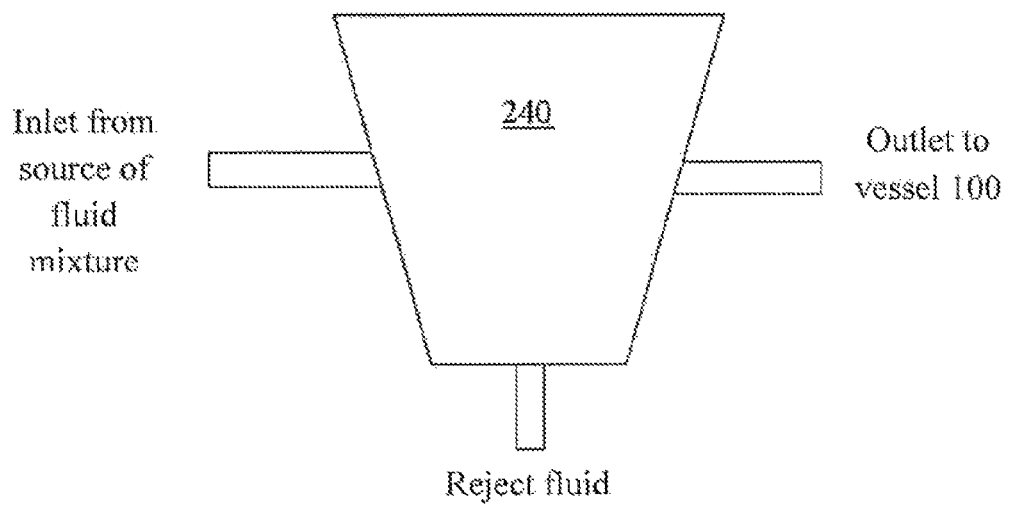
FIG. 12A is an additional fluid separation device or system which may be used with some embodiments of the present invention.
Figure 12B:
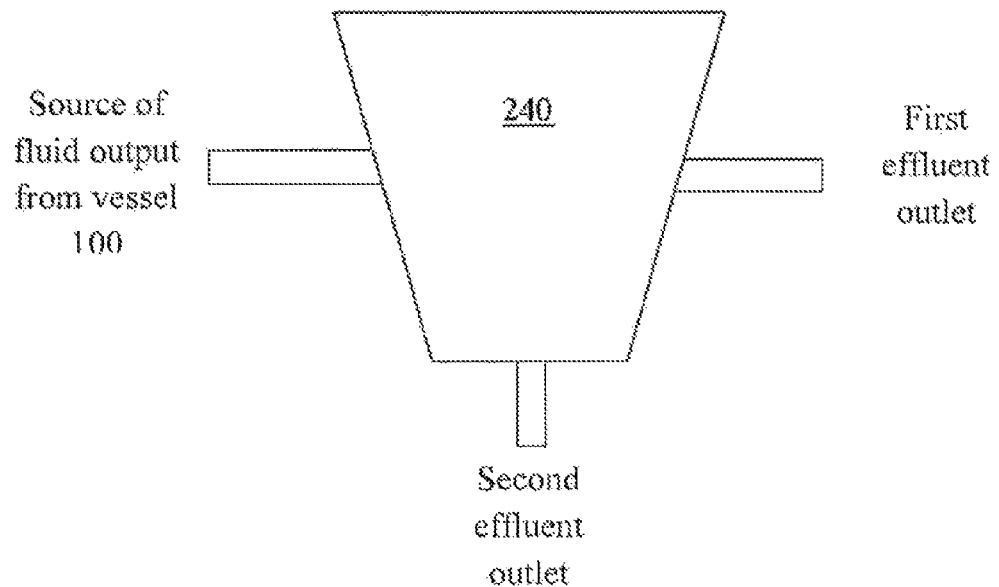
FIG. 12B is an additional fluid separation device or system which may be used with some embodiments of the present invention.

An additional fluid separation device or system 240 (FIGS. 12A and 12B) may be present upstream or downstream of vessel 100. Such additional systems may pre-treat the fluid mixture to deliver a partially separated solution to vessel 100, or may post-treat fluid output from vessel 100 to further separate the output fluid into at least a first and a second effluent. Such additional systems may be similar to vessel 100, or may be other systems or devices, such as, for example, a hydrocyclone-based separation system.

A method of utilizing embodiments of the apparatus described above to separate a fluid mixture may include an act of introducing a fluid mixture to be separated into vessel 100. The fluid mixture may be introduced from a source of fluid mixture through fluid inlet or inlets 126. In some embodiments a gas may be introduced into the fluid mixture before it is introduced into the vessel. In some embodiments, a spiral preliminary separator, such as the SPIRALSEP™ separator described in U.S. Pat. No. 5,277,803 may be present in fluid inlet or inlets 126 or between a source of fluid mixture and fluid inlet or inlets 126. Fluid passing through preliminary separator may be at least partially separated into various components present in the fluid mixture. For example, hydrocarbons that may be present in the fluid mixture may be at least partially agglomerated prior to introduction of the fluid mixture into the vessel.

A fluid mixture introduced into the vortex generation zone 114 flows rotationally upwards through the vortex generation zone. In some embodiments, this upward flow may be at a rate of between about 0.1 and 0.5 feet/second. Such a rate may provide adequate residence time of a fluid mixture in the vortex generation zone to sufficiently mix with a gas that may also be introduced into the vortex generation zone. This upwards flow may be facilitated by introducing the fluid mixture into the vortex generation zone at an upward angle. This may be accomplished by including an upward angled end portion on fluid inlet or inlets 126. The fluid may also flow in a rotational manner in the vortex generation zone. This rotational flow may be facilitated by introducing the fluid mixture at an angle with a component tangential to the internal wall of the vortex generation zone proximate the location of fluid mixture introduction. The rotational component of the flow of the fluid mixture may increase as the fluid mixture flows upward through the vortex generation zone due to the tapered shape of the vortex generation zone. As the fluid mixture flows rotationally in the vortex generation zone, components in the fluid mixture with a lower density relative to other components may migrate toward a central vertical axis of the vortex generation zone while more dense components migrate toward the tapered wall 112, due to the action of centripetal and/or centrifugal force.

Gas may also be introduced into the vortex generation zone from a source of gas 230. The gas may be introduced through gas inlet or inlets 124. The gas may have the potential to change a characteristic of a component of the fluid mixture to impart a change in its effective density and/or viscosity versus other fluid components. In some embodiments the gas may be, for example, air, methane, acetylene, natural gas, and combinations thereof. The gas may be introduced directly in a gaseous state, or as gas dissolved in a fluid, or as gas bubbles carried by a fluid. In some embodiments, a gas bubble generator 220 may supply gas bubbles to gas inlets 122 and/or 124. The gas bubble generator 220 may include a dissolved gas flotation pump, such as, for example, that described in U.S. Pat. No. 6,337,023, incorporated herein by reference in its entirety, which may be utilized to provide a fluid comprising a dissolved gas to gas inlets 122 and/or 124. In many instances it may be desirable to introduce gas bubbles that are smaller rather than larger in order to increase the available surface area of the gas bubbles. This also allows the creation of more gas bubbles per given volume of gas introduced, which may save on chemical costs and which may provide for a greater potential for gas bubbles to contact specific components of the fluid mixture. For example, in some embodiments, a dissolved gas flotation pump may be utilized to introduce gas bubbles with a size of between about five and 100 microns in diameter into the vortex generation zone of a fluid separation vessel. In some embodiments, a dissolved gas flotation pump may introduce gas with an average bubble diameter of about 50 to 70 microns into the vortex generation zone and/or the separation zone of a fluid separation vessel.

In some embodiments, at least a portion of the gas introduced into the fluid by the dissolved gas flotation pump may be gas recycled from vessel 100 through a gas outlet, such as gas outlet 136 illustrated in FIG. 4. Gas outlet 136 may be located in a wall of zone 150 to capture gas that enters zone 150 along with the less dense component of the fluid mixture. A conventional gas recovery subsystem as is known in the art may be present in some embodiments in order to facilitate the recovery of gas from the gas outlet 136 and/or to recover dissolved gasses from fluids exiting the vessel. Gas may also be introduced into the vessel from a separate source of gas in fluid communication with a gas inlet of a gas bubble generator or dissolved gas flotation pump.

As the fluid mixture flows through the vortex separation zone, gas introduced with the fluid mixture or through gas inlet or inlets 124 may contact less dense components, such as, for example, hydrocarbons that may be present in the fluid mixture. In some embodiments, a surfactant may be added to the fluid mixture in the vortex generation zone to facilitate the selective contact of gas with at least one fluid component.

As the fluid mixture exits the vortex generation zone 114, it may enter the separation zone 116. In the separation zone, the rotational velocity of the fluid mixture may decrease due to friction, due to an increased cross sectional area of the separation zone as opposed to the vortex generation zone, and/or due to interference with the rotational flow by coalescence material 128. Less dense components of the fluid mixture, such as, for example, hydrocarbons may float upward through the separation zone. Gas which may come into contact with the less dense component or components may facilitate the process of upward flotation. The denser component or components and/or fluid mixture rich in the denser component or components will move downward through the separation zone between tapered wall 112 and vessel wall 102 for removal.

In some instances, some of the less dense component may remain in the fluid rich in the denser component as this fluid flows downward through the separation zone. In embodiments in which the separation zone includes one or more gas inlets 122, gas or fluid containing gas bubbles and/or dissolved gas may flow upwards through the separation zone due to differences in density between the fluid in the separation zone and the introduced gas-containing fluid, and/or due to an upward angle of introduction of the gas-containing fluid. This counter flow of the fluid rich in a denser component of the fluid mixture and gas in the separation zone facilitates the contact of gas to less dense components of the fluid that may have remained with the fluid rich in the denser component or components. As gas contacts some of these remaining components, their effective buoyancy increases and they float upwards through the separation zone for removal at the top of the separation zone. In some embodiments, there is no upper limit to the amount of gas that may be introduced into the separation zone. In other embodiments, an upper limit on the amount of gas that may be introduced into the separation zone may be determined by calculating at what point the gas/fluid mix in the separation zone becomes less dense than the less dense component of the fluid mixture.

In some embodiments, less dense components such as, for example, hydrocarbons which may have remained in the fluid mixture rich in the denser component as droplets or as dissolved components may coalesce on coalescence material 128 as the fluid rich in the denser component moves downward through the separation zone. On the coalescence material, the less dense component or components may come out of solution and may form droplets as additional molecules or additional droplets coalesce. Gas from gas inlet or inlets 122 may sparge the coalescence material, removing the accumulated component or components from the coalescence material and/or contacting some or all of the component or components present on or in the coalescence packing 128 and/or in separation zone 116.

In some embodiments, the fluid rich in a denser component of the fluid mixture in the separation zone has a rotational velocity which induces additional separation of less dense components from denser components as denser fluid components migrate toward vessel side wall 102 and less dense components migrate toward tapered wall 112 due to the action of centripetal and/or centrifugal force.

As the less dense component or components of the fluid mixture float upward through the separation zone, they may reach upper internal wall 118 and migrate toward fluid outlet 120. Fluid rich in the less dense component may exit the separation zone through outlet 120 and enter region 150 defined by vessel side wall 102, vessel upper wall 104 and upper internal wall 118. This fluid may then be removed, either continuously or intermittently, through fluid outlet 108. Alternate embodiments may utilize fluid outlets and/or fluid component separation systems other than the head-in-head outlet designs illustrated in FIGS. 1, 3, and 4. For example, fluid containing coalesced hydrocarbons may be removed from the vortex generation zone using any of a variety of means, including, for example, a skimmer, a suction pump, a siphoned drain, or a weir.

In some methods according to the present invention, a fluid separation system such as is illustrated in any of FIGS. 1, 3, and 4 may be operated with a level of fluid below the upper level of tapered wall 112 of the vortex generation zone. In such a configuration, the fluid rotating in the vortex generation zone may form a dished parabolic upper surface due to centripetal and centrifugal forces. It may be desirable to maintain a rotational velocity at the surface of the fluid in the vortex generation zone so as to avoid the formation of significant dishing of the surface of the fluid or the formation of a deep "vortex bowl" in order to facilitate the removal of fluid from the interior of the vortex generation zone. The formation of a deep "vortex bowl" may be avoided in some instances by reducing the wall taper angle and/or a fluid mixture flow into the vortex generation zone. For example, for a vortex generation zone with a height of 2.5 feet, a base diameter of 27 inches, and an inlet flow of oily water of 145 gallons/minute, a "vortex bowl" may begin to develop if the vortex generation zone walls taper at an angle of greater than about 5 degrees from a vertical axis.

In methods of operation where the fluid level does not rise above the upper level of the vortex generation zone, fluid rich in a less dense component may be removed from a region proximate the central axis of the vortex generation zone and fluids rich in a more dense component may be removed from a region proximate the wall of the vortex generation zone. Numerous devices and methods may be utilized to effect removal of fluids from the vortex generation zone, including for example, a pump connected to a tube inserted into a desired region of the vortex generation zone, a siphon tube inserted into a desired region of the vortex generation zone, or one or more fluid outlets built into the wall of the vortex generation zone itself.

Figure 6:
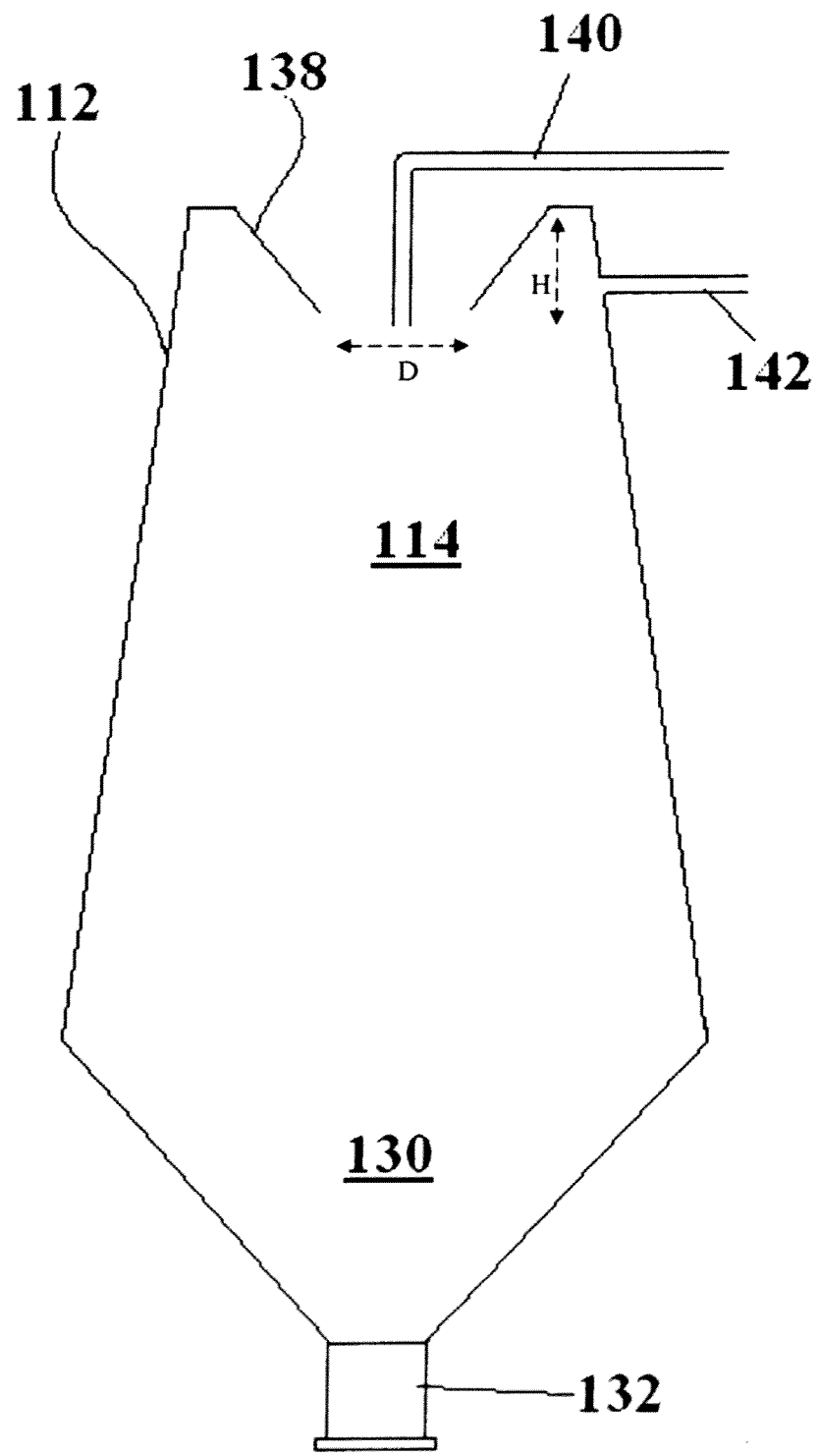
FIG. 6 is a partial cross-sectional view of an apparatus according to a further embodiment of the present invention.

An embodiment of an apparatus according to the present invention wherein fluid is removed directly from a vortex generation zone is illustrated in FIG. 6. In FIG. 6, attached to the upper edge of the tapered wall 112 of the vortex generation zone is a truncated cone-like fluid outlet 138 extending into the top of the vortex generation zone. In use, a less dense component may pool in the interior space of fluid outlet 138 and may be removed through outlet pipe 140. A more dense component may be removed from the vortex generation zone through fluid outlet 142. The width D of the lower end of outlet 138 may in some embodiments be small, for example, one to two inches in diameter, in order to allow only fluid proximate the central axis of the vortex generation zone to enter. This facilitates separation of the less and more dense components because the less dense components present proximate the central axis of the vortex generation zone will preferably enter outlet 138. The depth H of outlet 138 may also be relatively shallow, in some embodiments about six to seven inches. This allows a sufficient height within the vortex generation zone in which the fluid mixture may separate into constituent components while also allowing an acceptable depth of the outlet 138 from which outlet pipe 140 may draw fluid to the output. The cone-like fluid outlet 138 may also in some embodiments be utilized in a vessel such as is illustrated in FIG. 1, 2, or 4 to remove fluid from the upper portion of the separation zone 116.

Various control systems may be utilized to control the operation of vessel 100. Parameters which may be controlled include the flow of fluid into the vessel, the flow of fluid through any of the fluid outlets of the vessel, and the flow of gas into or out of the vessel. For example, a control system may include a feedback mechanism to monitor the level of fluid in the vessel and adjust the input and output flows of fluid to maintain the fluid level between a predetermined minimum and maximum level. Concentration monitors may provide feedback as to the concentration of components in fluid output from the vessel and may adjust the flow rates of fluid and/or the residence time of fluid in the vessel as is required to obtain a desired concentration of a particular component in a particular fluid output. A dissolved gas sensor may be utilized to monitor the level of dissolved gas present in fluid in the vessel and may provide feedback in order to adjust the flow of fluid from a dissolved gas flotation pump into the vessel as is required.

The system and controller of one or more embodiments of the invention provide a versatile unit having multiple modes of operation, which can respond to multiple inputs to increase the efficiency of the system.

Figure 7:
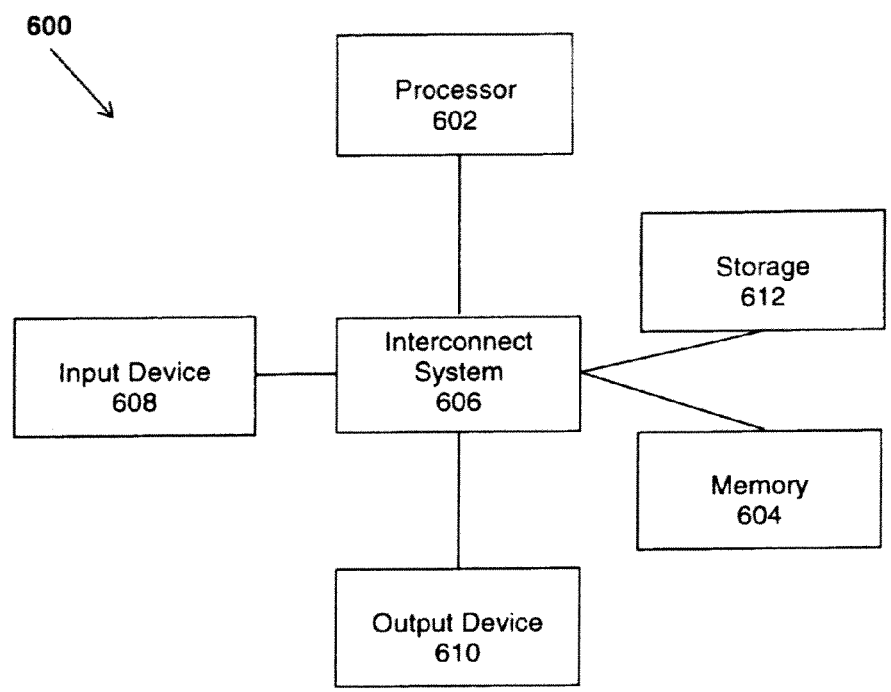
FIG. 7 is a schematic diagram illustrating a computer system upon which one or more embodiments of the invention may be practiced.

A controller for the system of the invention may be implemented using one or more computer systems 600 as exemplarily shown in FIG. 7. Computer system 600 may be, for example, a general-purpose computer such as those based on in Intel PENTIUM®-type processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for water treatment systems.

Computer system 600 can include one or more processors 602 typically connected to one or more memory devices 604, which can comprise, for example, any one or more of a disk drive memory, a flash memory device, a RAM memory device, or other device for storing data. Computer system 600 may comprise a neural network. Memory 604 is typically used for storing programs and data during operation of the computer system 600. For example, memory 604 may be used for storing historical data relating to the parameters over a period of time, as well as operating data. Software, including programming code that implements embodiments of the invention, can be stored on a computer readable and/or writeable nonvolatile recording medium (discussed further with respect to FIG. 8), and then typically copied into memory 604 wherein it can then be executed by processor 602. Such programming code may be written in any of a plurality of programming languages, for example, Java, Visual Basic, C, C#, or C++, Fortran, Pascal, Eiffel, Basic, COBAL, or any of a variety of combinations thereof.

Components of computer system 600 may be coupled by one or more interconnection mechanisms 606, which may include one or more busses (e.g., between components that are integrated within a same device) and/or a network (e.g., between components that reside on separate discrete devices). The interconnection mechanism typically enables communications (e.g., data, instructions) to be exchanged between components of system 600.

Computer system 600 can also include one or more input devices 608, for example, a keyboard, mouse, trackball, microphone, touch screen, and other man-machine interface devices as well as one or more output devices 610, for example, a printing device, display screen, or speaker. In addition, computer system 600 may contain one or more interfaces (not shown) that can connect computer system 600 to a communication network (in addition or as an alternative to the network that may be formed by one or more of the components of system 600).

According to one or more embodiments of the invention, the one or more input devices 608 may include sensors for measuring parameters of the system and/or components thereof. Alternatively, sensors, metering valves and/or pumps, or all of these components may be connected to a communication network (not shown) that is operatively coupled to computer system 600. Any one or more of the above may be coupled to another computer system or component to communicate with computer system 600 over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

Figure 8:
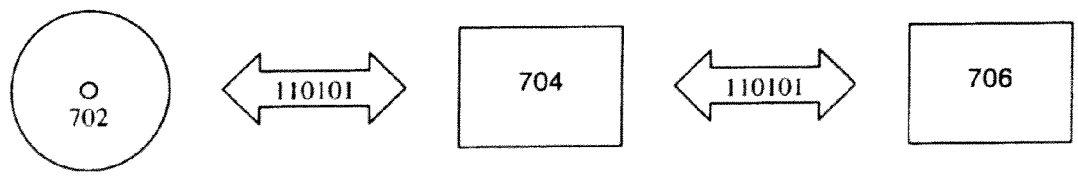
FIG. 8 is a schematic illustration of a storage system that may be used with the computer system of FIG. 7 in accordance with one or more embodiment so the invention.

As exemplarily shown in FIG. 8, a system controller can include one or more computer storage media such as readable and/or writeable nonvolatile recording medium 702 in which signals can be stored that define a program to be executed by one or more processors 602. Medium 702 may, for example, be a disk or flash memory. In typical operation, processor 602 can cause data, such as code that implements one or more embodiments of the invention, to be read from storage medium 702 into a memory 704 that allows for faster access to the information by the one or more processors than does medium 702. Memory 704 is typically a volatile, random access memory such as a dynamic random access memory (DRAM) or static memory (SRAM) or other suitable devices that facilitates information transfer to and from processor 602.

Although computer system 600 is shown by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the controller can be performed in separate computers, which in turn, can be communication through one or more networks.

EXAMPLE

Figure 9:
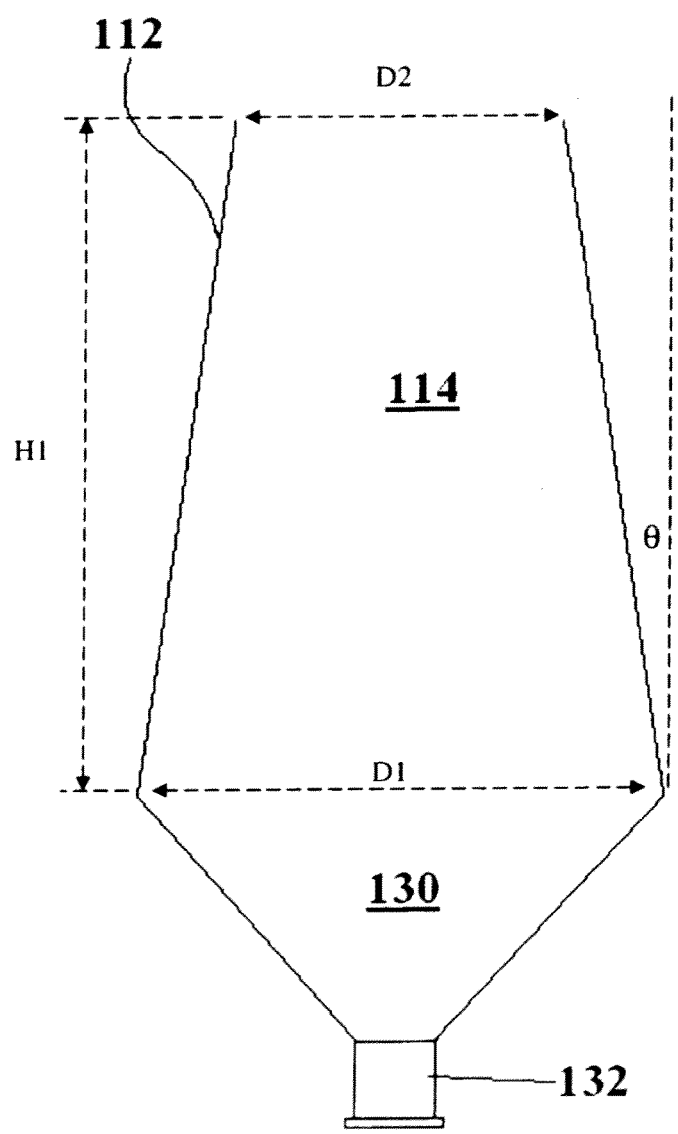
FIG. 9 is a partial cross-sectional view of an apparatus according to an embodiment of the present invention.

A test of the removal efficiency of a vessel comprising a vortex generation zone according to one aspect of the invention was performed. Referring to FIG. 9, the vortex generation zone had a wall angle θ of 9° from a vertical axis, a base diameter D1 of 27 inches, an upper opening diameter D2 of 17.5 inches and a height H1 of 30 inches. The vessel had two fluid inlets spaced about 180° apart from one another fed by a circulating pump and two gas inlets spaced about 180° apart from one another fed with air dissolved in water by a dissolved gas flotation pump (DGF pump). Each fluid inlet was alternatively spaced approximately 90° from each gas inlet. The gas inlets and the fluid inlets were all positioned proximate a plane passing through the widest cross sectional area of the vessel. The fluid inlets were angled at 1.2° above a horizontal axis, while the gas inlets were positioned approximately horizontally. All inlets were constructed to introduce oily water and/or water containing dissolved air into the vessel substantially tangentially to the interior wall at their point of entry.

The volume of the vortex generation zone of the vessel used was 51 gallons, and the volume of the solids collection zone was 14 gallons.

The outer vessel in which the vortex generation zone was housed included two gas inlets spaced about 180° apart extending into the separation zone perpendicular to the vessel wall, and angled upwards at 45° from a horizontal axis.

Oily water to be separated and water with dissolved air were introduced into the vessel at various flow rates. The oily water was produced by adding 110 ppm of 37 API gravity degree crude oil to fresh water introduced into the vortex generation zone. The flow rate for the oily water from the circulating pump was varied from about 50 and 150 gallons/minute and the flow rate of the water with dissolved air was varied from about 60 and 95 gallons/minute. The removal efficiency of oil from the oily water was measured. The amount of oil introduced with the water to generate the oily water varied from about 60 to about 115 ml/minute using an oil injection pump, the amount of oil introduced at the inlet of the system, located near the outer vessel, into the vortex generation zone increased with increased circulating pump flow rate. 14 data points were taken according to central composite design experiment criteria. The results are shown below in Table 1 and are illustrated graphically in FIG. 10 and FIG. 11.

TABLE 1

| Run Order | Bubble (GPM) | Centrifugal (GPM) | Total (GPM) | Cir/DGF Pumps Ratio | Oil Injection (ml/min) | Total Oil Content at Inlet (ppm) | Total Oil Content at outlet (ppm) | % Efficiency |
|---|---|---|---|---|---|---|---|---|
| 1 | 76.50 | 102.00 | 178.50 | 1.33 | 59.92 | 44 | 31 | 29.54 |
| 2 | 76.50 | 158.57 | 235.07 | 2.07 | 61.43 | 118 | 88 | 25.42 |
| 3 | 95.59 | 102.00 | 197.59 | 1.06 | 87.71 | 114 | 46 | 59.64 |
| 4 | 76.50 | 102.00 | 178.50 | 1.33 | 100.74 | 302 | 60 | 80.13 |
| 5 | 76.50 | 45.43 | 121.93 | 0.59 | 87.71 | 208 | 43 | 79.32 |
| 6 | 76.50 | 102.00 | 178.50 | 1.33 | 87.71 | 170 | 61 | 64.11 |
| 7 | 57.41 | 102.00 | 159.41 | 1.77 | 87.71 | 118 | 55 | 53.38 |
| 8 | 90.00 | 62.00 | 152.00 | 0.68 | 115.51 | 231 | 61 | 73.59 |
| 9 | 63.00 | 142.00 | 205.00 | 2.25 | 114.00 | 233 | 104 | 55.36 |
| 10 | 76.50 | 102.00 | 178.50 | 1.33 | 78.33 | 173 | 85 | 50.86 |
| 11 | 76.50 | 102.00 | 178.50 | 1.33 | 87.71 | 323 | 105 | 67.49 |
| 12 | 76.50 | 102.00 | 178.50 | 1.33 | 74.69 | 222 | 128 | 42.34 |
| 13 | 63.00 | 62.00 | 125.00 | 0.98 | 97.10 | 139 | 74 | 46.76 |
| 14 | 90.00 | 142.00 | 232.00 | 1.57 | 87.71 | 173 | 102 | 41.04 |

Figure 10:
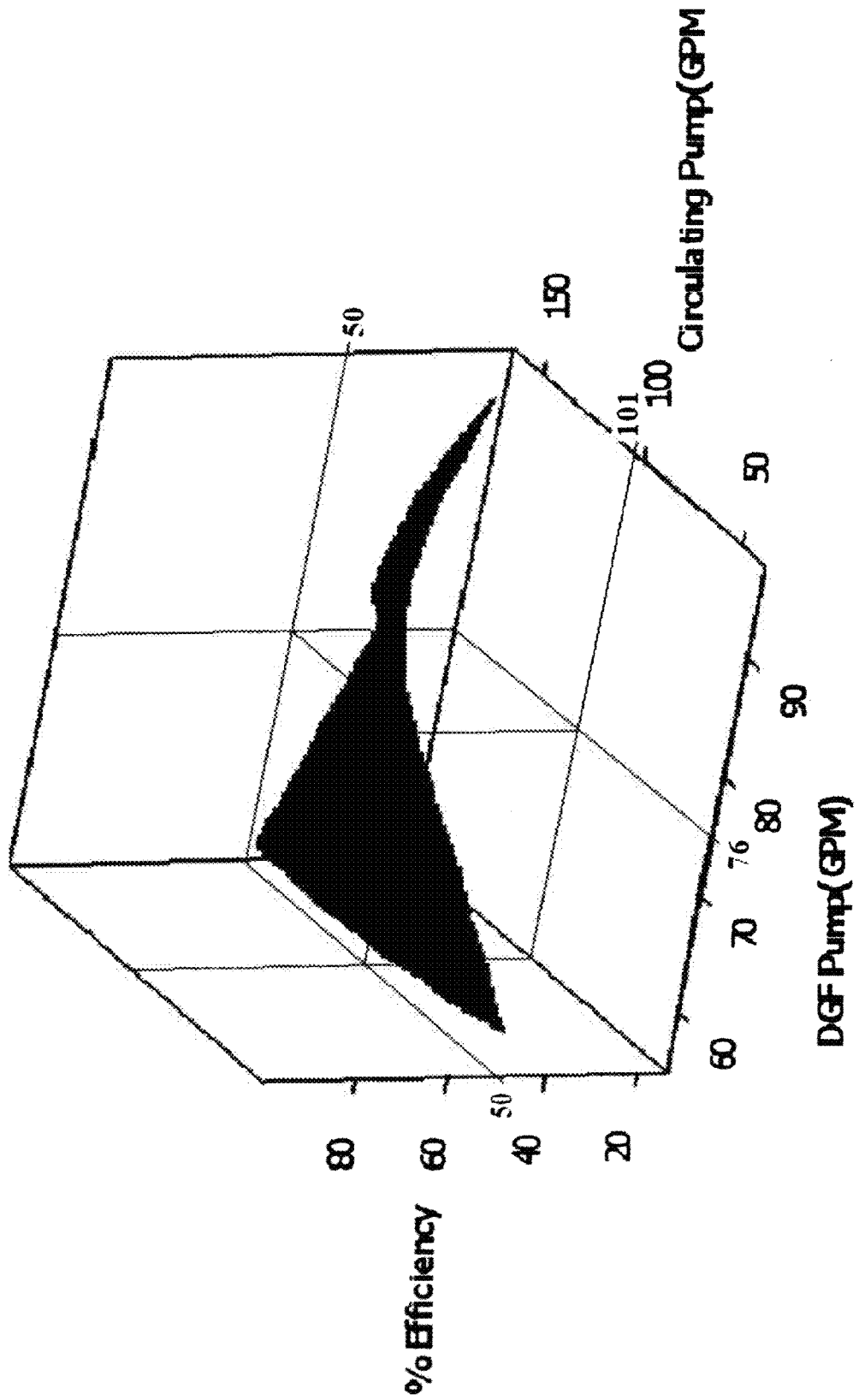
FIG. 10 is a surface plot of percent efficiency versus pump flow according to an embodiment of the present invention.

FIG. 10 shows a response surface methodology (RSM) fit to the data from the central composite design (CCD) experiment. The equation of the surface fit in FIG. 10 is:

$$Y = -76.92 + 2.14*X1 + 1.14*X2 - 0.019*X1*X2$$

In this equation, Y is the percent removal efficiency, X1 is the DGF pump flow rate in gallons/min and X2 is the circulating pump flow rate in gallons/min. Thus, FIG. 10 is a three dimensional surface plot of the oil removal efficiency as it corresponds to the flows of both the circulating pump which introduced the oily water and the DGF pump which introduced the air dissolved in water. As can be seen from the Response Surface Methodology (RSM) plot, FIG. 10, the oil removal efficiency generally increased with higher DGF pump inlet rates, and with lower circulating pump inlet rates.

Without being bound to a particular theory, it is believed that these results reflect that oil removal efficiency increases with increased amounts of air bubbles introduced into the oily water by the DGF pump. The increased amount of air bubbles allowed more air bubbles to contact more oil and more effectively bring this oil to the top of the vessel to be removed.

Figure 11:
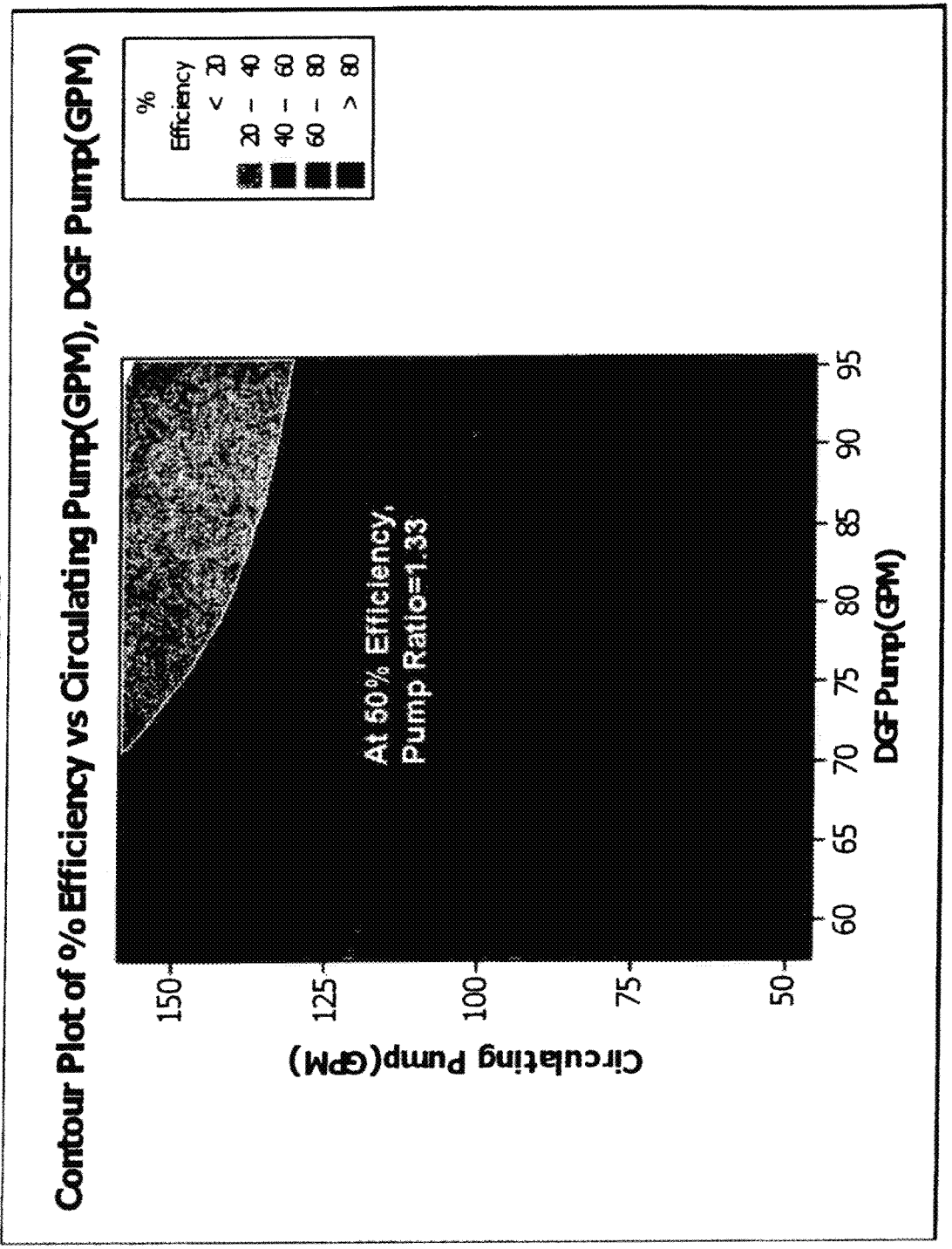
FIG. 11 is a contour plot of percent efficiency versus pump flow according to an embodiment of the present invention.

FIG. 11 is a contour plot of the oil removal efficiency as it corresponds to the flows of both the circulating pump which introduced the oily water and the DGF pump which introduced the air dissolved in water. This plot is a two dimensional representation of the surface plot of FIG. 10 as viewed from above along a line parallel with the "efficiency or Y-axis". Again, as can be seen from the plot, the oil removal efficiency generally increased with higher DGF pump inlet rates, and with lower circulating pump inlet rates. However, at higher circulating pump flow rates, i.e. above 125 gallons/minute, the oil removal efficiency dropped with increasing DGF flow rate.

As seen in FIG. 11, if the combined flow rates of the circulating pump and the DGF pump became too high (the upper right region of FIG. 11) oil removal efficiency decreased. Without being bound to a particular theory, it is believed that this drop in removal efficiency indicates that too high a flow rate of liquid through the vessel may decrease the residence time of the fluid in the vortex generation zone and/or reduce the air bubble-oil droplet contact time to a point at which there is not enough residence time or contact time for sufficient contact between the oily water and the air bubbles.

Also shown in FIG. 11 is a point corresponding to a 50% oil removal efficiency. This point was determined by the intersection of a plane corresponding to a 50% oil removal efficiency with the surface plot of FIG. 10. As illustrated in FIG. 11, this point corresponds to a circulating pump flow rate of approximately 101 GPM and a DGF pump flow rate of approximately 76 GPM resulting in a ratio of the circulating pump flow rate to DGF pump flow rate of approximately 1.33. Points on FIG. 11 with a lower ratio of circulating pump flow rate to DGF pump flow rate (i.e. points downward and/or to the right to the specified point on FIG. 11) resulted in higher oil removal efficiencies. Thus, if an average 50% removal efficiency were defined as a minimum acceptable operating efficiency at a given residence time or contact time, a device such as that from which the data in FIG. 10 and FIG. 11 was obtained could be run with a ratio of circulating pump flow rate to DGF pump flow rate of 1.33 or lower.

Desirable operating ratios of circulating pump flow rate to DGF pump flow rate for other apparatus according to embodiments of the present invention may be determined in a similar manner as above or that which is based on dynamic similitude of any size prototype and the current model.

Having thus described several aspects of at least one embodiment of this invention, it is to be appreciated various alterations, modifications, and improvements will readily occur to those skilled in the art.

For example, in some embodiments, a separation vessel may be operated without an outer wall 102, coalescence material 128 or a separation zone 116. The walls 112 of the vortex generation zone may serve as the outer walls of the vessel.

In alternate embodiments, the vessel may include an outer wall 102 and separation zone 116, but in operation, the fluid level may be maintained below the upper end of the vortex generation zone, and fluid will be withdrawn directly from the vortex generation zone.

Such alterations, modifications, and improvements are intended to be part of this disclosure, and are intended to be within the spirit and scope of the invention. Accordingly, the foregoing description and drawings are by way of example only.

What is claimed is:

1. An apparatus for separating a fluid mixture comprising:
a vessel;
a vortex generation zone defined by a tapered wall positioned within the vessel;
a fluid inlet extending into the vortex generation zone at an angle having a component tangential to an internal wall of the vortex generation zone at a point on the internal wall proximate to the fluid inlet;

a gas inlet extending into the vortex generation zone; and
a head-in-head fluid outlet defined by:
- an upper wall internal to the vessel, the upper wall including a portion at a periphery thereof positioned proximate a side wall of the vessel and lower than an upper fluid outlet in the upper wall located proximate a central vertical axis of the vessel and above a central region of the vortex generation zone, and
- an upper vessel fluid outlet defined in the side wall of the vessel above the upper wall.

2. The apparatus of claim 1, wherein the tapered wall comprises an angle to increase a rotational velocity of a fluid mixture flowing through the vortex generation zone.

3. The apparatus of claim 2, wherein the tapered wall comprises an angle ranging from greater than zero to about 14 degrees from a vertical axis.

4. The apparatus of claim 3, wherein the tapered wall comprises an angle ranging from about five to about ten degrees from the vertical axis.

5. The apparatus of claim 4, wherein the tapered wall comprises an angle of about nine degrees from the vertical axis.

6. The apparatus of claim 3, wherein the vortex generation zone is constructed and arranged to direct a fluid mixture upward.

7. The apparatus of claim 6, wherein the vortex generation zone is constructed and arranged to direct a gas upward.

8. The apparatus of claim 3, wherein the fluid inlet extends into the vortex generation zone at a second angle to induce an upward flow of a fluid mixture.

9. The apparatus of claim 8, wherein the second angle ranges from greater than zero to about ten degrees above a horizontal plane.

10. The apparatus of claim 9, wherein the second angle ranges from greater than zero to about five degrees above the horizontal plane.

11. The apparatus of claim 10, wherein the second angle is about one degree above the horizontal plane.

12. The apparatus of claim 1, further comprising a preliminary separator positioned between a source of fluid mixture and the fluid inlet.

13. The apparatus of claim 1, wherein the vortex generation zone is defined by a wall shaped as an inverted truncated cone.

14. The apparatus of claim 1, further comprising a solids collection region positioned below the vortex generation zone and in fluid communication with the vortex generation zone.

15. The apparatus of claim 1, wherein the fluid inlet is positioned proximate to a region of the vortex generation zone having a greatest cross sectional area.

16. The apparatus of claim 1, further comprising a plurality of fluid inlets in fluid communication with the vortex generation zone.

17. The apparatus of claim 16, wherein the plurality of fluid inlets are approximately evenly spaced about a periphery of the vortex generation zone.

18. The apparatus of claim 17, wherein the plurality of fluid inlets are positioned proximate a region of the vortex generation zone having a greatest cross sectional area.

19. The apparatus of claim 16, further comprising a plurality of gas inlets in fluid communication with the vortex generation zone wherein the plurality of gas inlets and the plurality of fluid inlets are alternatingly and approximately evenly spaced about a perimeter of the vortex generation unit.

20. The apparatus of claim 1, further comprising a plurality of gas inlets in fluid communication with the vortex generation zone.

21. The apparatus of claim 20, wherein the plurality of gas inlets are approximately evenly spaced about a perimeter of the vortex generation unit.

22. The apparatus of claim 20, wherein the plurality of gas inlets are positioned proximate to a region of the vortex generation zone having a greatest cross sectional area.

23. The apparatus of claim 20, wherein the plurality of gas inlets are positioned below a horizontal plane defined by the fluid inlet extending into the vortex generation zone.

24. The apparatus of claim 20, wherein the plurality of gas inlets are positioned above a horizontal plane defined by the fluid inlet extending into the vortex generation zone.

25. An apparatus for separating a fluid mixture comprising:
a vessel;
a vortex generation zone defined by a tapered wall positioned within the vessel;
a separation zone in fluid communication with the vortex generation zone and positioned within the vessel and external to the vortex generation zone;
a fluid inlet in fluid communication with the vortex generation zone;
a gas inlet extending into the vortex generation zone; and
a head-in-head fluid outlet defined by:
- an upper wall internal to the vessel, the upper wall including a portion at a periphery thereof positioned proximate a side wall of the vessel and lower than a fluid outlet in the upper wall located proximate a central vertical axis of the vessel and above a central region of the vortex generation zone, and
- an upper vessel fluid outlet defined in the side wall of the vessel above the upper wall.

26. The apparatus of claim 25, further comprising a second fluid outlet positioned below the fluid outlet.

27. The apparatus of claim 25, further comprising a plurality of gas inlets in the separation zone.

28. The apparatus of claim 27, wherein the plurality of gas inlets are spaced approximately evenly about a perimeter of the vessel.

29. The apparatus of claim 27, further comprising a coalescing material positioned in the separation zone above at least one of the plurality of gas inlets.

30. The apparatus of claim 29, wherein the coalescing material substantially surrounds a periphery of the vortex generation zone.

31. The apparatus of claim 29, wherein the vortex generation zone is defined by a wall shaped as an inverted truncated cone.

32. The apparatus of claim 31, further comprising a second fluid inlet in fluid communication with the vortex generation zone and located proximate a region of the vortex generation zone having a greatest cross sectional area.

33. The apparatus of claim 25, further comprising a plurality of gas inlets in the vortex generation zone.

34. The apparatus of claim 33, wherein the plurality of gas inlets are spaced approximately evenly about a perimeter of the vortex generation zone.

35. The apparatus of claim 34, wherein the plurality of gas inlets are positioned proximate to a region of the vortex generation zone having a greatest cross sectional area.

36. The apparatus of claim 25, further comprising a plurality of fluid inlets approximately evenly spaced about a perimeter of the vortex generation zone.

37. The apparatus of claim 36, wherein the plurality of fluid inlets are positioned proximate to a region of the vortex generation zone having a greatest cross sectional area.

38. The apparatus of claim 37, wherein at least one of the plurality of fluid inlets extends into the vortex generation zone at an angle having a component tangential to an internal wall of the vortex generation zone at a point on the internal wall proximate to the fluid inlet.

39. The apparatus of claim 38, wherein the plurality of gas inlets and the plurality of fluid inlets are approximately evenly spaced about a perimeter of the vortex generation zone.

40. The apparatus of claim 25, further comprising a gas bubble generator in fluid communication with the gas inlet.

41. The apparatus of claim 40, wherein the gas bubble generator comprises a dissolved gas flotation pump.

42. The apparatus of claim 41, wherein at least one of the plurality of fluid inlets is positioned in the vortex generation zone and angled above a horizontal plane.

43. The apparatus of claim 25, further comprising at least one additional fluid separation vessel.

44. The apparatus of claim 43, wherein the at least one additional fluid separation vessel is a hydrocyclone.

45. The apparatus of claim 25, further including a feedback sub-system configured and arranged to modulate a flow of gas from a gas bubble generator in fluid communication with the gas inlet in response to a level of a dissolved gas in the solution.

46. The apparatus of claim 25, further comprising a source of gas fluidly connected to a gas inlet of the gas bubble generator, the source of gas comprising at least one of methane, acetylene, and natural gas.

47. The apparatus of claim 46, further comprising a gas recovery sub-system in fluid communication with an interior region of the vessel.

48. A method of separating a fluid mixture comprising:
providing a fluid mixture comprising a first component and a second component, the first component having a density different than a density of the second component;
introducing the fluid mixture into a vortex generation zone defined by a frustoconical tapered wall having a cross sectional diameter at base thereof which is larger than a cross sectional area at an upper end thereof positioned within a vessel;
inducing upward flow of the fluid mixture in the vortex generation zone;
imparting a confined rotational momentum to the first component and the second component in the vortex generation zone;
introducing gas into the fluid mixture in the vortex generation zone; and
withdrawing at least a portion of the fluid mixture rich in the first component from a head-in-head fluid outlet defined by:
an upper wall internal to the vessel, the upper wall including a portion at a periphery thereof positioned proximate a side wall of the vessel and lower than an upper fluid outlet in the upper wall located proximate a central vertical axis of the vessel and above a central region of the vortex generation zone, and
an upper vessel fluid outlet defined in the side wall of the vessel above the upper wall.

* * * * *